United States Patent
Chatterjee et al.

(10) Patent No.: US 8,082,407 B1
(45) Date of Patent: Dec. 20, 2011

(54) WRITABLE SNAPSHOTS FOR BOOT CONSOLIDATION

(75) Inventors: Paresh Chatterjee, Fremont, CA (US); Narayanaswami Ganapathy, Fremont, CA (US); Raja Jayaraman, Fremont, CA (US); Ajit Narayanan, Chennai (IN)

(73) Assignee: American Megatrends, Inc., Norcross, GA (US)

(*) Notice: Subject to any disclaimer, the term of this patent is extended or adjusted under 35 U.S.C. 154(b) by 753 days.

(21) Appl. No.: 12/104,116

(22) Filed: Apr. 16, 2008

Related U.S. Application Data

(60) Provisional application No. 60/923,870, filed on Apr. 17, 2007.

(51) Int. Cl.
 *G06F 12/00* (2006.01)

(52) U.S. Cl. .................................... 711/162; 707/639

(58) Field of Classification Search .................. 711/162; 707/639
See application file for complete search history.

(56) References Cited

U.S. PATENT DOCUMENTS

| | | | |
|---|---|---|---|
| 4,942,579 A | 7/1990 | Goodlander et al. |
| 5,257,367 A | 10/1993 | Goodlander et al. |
| 5,530,850 A | 6/1996 | Ford et al. |
| 5,604,862 A | 2/1997 | Midgely et al. |
| 5,720,027 A | 2/1998 | Sarkozy et al. |
| 5,732,238 A | 3/1998 | Sarkozy |
| 5,790,774 A | 8/1998 | Sarkozy |
| 5,893,919 A | 4/1999 | Sarkozy et al. |
| 5,974,426 A | 10/1999 | Lee et al. |
| 6,098,128 A | 8/2000 | Velez-McCaskey et al. |
| 6,298,425 B1 | 10/2001 | Whitaker et al. |
| 6,311,193 B1 * | 10/2001 | Sekido ............................. 1/1 |
| 6,434,681 B1 | 8/2002 | Armangau |
| 6,460,054 B1 | 10/2002 | Grummon |
| 6,484,186 B1 | 11/2002 | Rungta |
| 6,487,561 B1 | 11/2002 | Ofek et al. |
| 6,665,815 B1 | 12/2003 | Goldstein et al. |
| 6,671,757 B1 | 12/2003 | Cash et al. |
| 6,694,336 B1 | 2/2004 | Mutler et al. |
| 6,748,504 B2 | 6/2004 | Sawdon et al. |
| 6,892,211 B2 | 5/2005 | Hitz et al. |
| 6,934,727 B2 | 8/2005 | Berkowitz et al. |
| 7,072,916 B1 | 7/2006 | Lewis et al. |
| 7,111,026 B2 | 9/2006 | Sato |
| 7,225,210 B2 | 5/2007 | Guthrie, II |
| 7,243,115 B2 | 7/2007 | Manley et al. |
| 7,363,444 B2 | 4/2008 | Ji |

(Continued)

OTHER PUBLICATIONS

U.S. Appl. No. 12/425,123 filed Apr. 16, 2009 entitled "Provisioning Space in a Data Storage System", Inventors: Chatterjee et al.

(Continued)

*Primary Examiner* — Hashem Farrokh
(74) *Attorney, Agent, or Firm* — McKeon, Meunier, Carlin & Curfman, LLC

(57) ABSTRACT

Boot consolidation based on writeable volume snapshots can leverage flexible mappings of snapshot dependencies. Such flexible mappings can be established by relating sequence numbers associated with various volume snapshots and can provide for an arbitrarily complex mapping to support a potentially unlimited number of writable snapshots in potentially any dependency configuration. Additionally, the pinning of volumes can provide support for chains of snapshots to depend from snapshots within other chains of snapshots. Merge agents can operate with writable snapshots and boot consolidation to provide system-wide updates where security patches, upgrades, and application software may be applied to a group of servers or a group of users in an efficient fashion.

17 Claims, 17 Drawing Sheets

U.S. PATENT DOCUMENTS

| | | | |
|---|---|---|---|
| 7,373,366 | B1 | 5/2008 | Chatterjee et al. |
| 7,415,486 | B2 | 8/2008 | Mutler |
| 7,457,980 | B2 | 11/2008 | Yang et al. |
| 7,536,529 | B1 | 5/2009 | Chatterjee et al. |
| 7,555,504 | B2 | 6/2009 | Bixby et al. |
| 7,603,391 | B1 | 10/2009 | Federwisch et al. |
| 7,617,217 | B1 | 11/2009 | Chen et al. |
| 7,707,183 | B2 | 4/2010 | Alstrin et al. |
| 2002/0029227 | A1 | 3/2002 | Multer et al. |
| 2002/0040369 | A1 | 4/2002 | Multer et al. |
| 2002/0161983 | A1 | 10/2002 | Milos et al. |
| 2003/0126242 | A1* | 7/2003 | Chang ............... 709/222 |
| 2003/0163630 | A1 | 8/2003 | Aasheim et al. |
| 2004/0030727 | A1 | 2/2004 | Armangau et al. |
| 2004/0128470 | A1 | 7/2004 | Hetzler et al. |
| 2005/0228957 | A1 | 10/2005 | Satoyama et al. |
| 2005/0246503 | A1* | 11/2005 | Fair ............... 711/147 |
| 2006/0206542 | A1 | 9/2006 | Wolfgang et al. |
| 2006/0218364 | A1 | 9/2006 | Kitamura |
| 2006/0236047 | A1 | 10/2006 | Shitomi |
| 2007/0150677 | A1 | 6/2007 | Homma et al. |
| 2007/0174690 | A1* | 7/2007 | Kambara et al. ............... 714/13 |
| 2007/0185940 | A1 | 8/2007 | Prahlad et al. |
| 2007/0226730 | A1* | 9/2007 | Coyle et al. ............... 717/170 |
| 2007/0266066 | A1 | 11/2007 | Kapoor et al. |
| 2008/0010308 | A1 | 1/2008 | Erdogan et al. |
| 2008/0010322 | A1 | 1/2008 | Lee et al. |
| 2008/0052480 | A1 | 2/2008 | Satoyama et al. |
| 2008/0104139 | A1 | 5/2008 | Xu et al. |
| 2008/0104443 | A1 | 5/2008 | Akutsu et al. |
| 2008/0183973 | A1* | 7/2008 | Aguilera et al. ............... 711/147 |
| 2008/0244205 | A1 | 10/2008 | Amano et al. |
| 2009/0044046 | A1 | 2/2009 | Yamasaki |
| 2009/0055608 | A1 | 2/2009 | Yamasaki |

OTHER PUBLICATIONS

U.S. Official Action dated Mar. 27, 2009 in U.S. Appl. No. 11/695,673.

U.S. Notice of Allowance / Allowability dated Jan. 12, 2009 in U.S. Appl. No. 11/254,347.

US 6,988,220, Jan. 2006, Eng et al. (Withdrawn).

Douglis et al., "Log-Structured File Systems," IEEE, 1989, pp. 124-129.

Green et al., "Designing a Fast, On-line Backup System for a Log-Structured File System," Digital Technical Journal, vol. 8, No. 2, 1996, pp. 32-45.

Peterson et al. "Ext3cow: A Time-Shifting File System for Regulatory Compliance," ACM Transactions on Storage, vol. 1, No. 2, May 2005, pp. 190-212.

Rosenblum et al., "The Design and Implementation of a Log-Structured File System," ACM Transactions on Computer Systems, vol. 10, No. 1, Feb. 1992, pp. 26-52.

U.S. Appl. No. 11/254,347, filed Oct. 20, 2005, entitled "Method, System, Apparatus, and Computer-Readable Medium for Provisioning Space in a Data Storage System," Inventors: Chatterjee et al.

U.S. Official Action dated Sep. 4, 2007 in U.S. Appl. No. 11/254,347.

U.S. Official Action dated Mar. 18, 2008 in U.S. Appl. No. 11/254,347.

U.S. Appl. No. 11/255,146 filed Oct. 20, 2005, entitled "Method, System, Apparatus, and Computer-Readable Medium for Taking and Managing Snapshots of a Storage Volume," Inventors: Chatterjee et al.

U.S. Official Action dated Aug. 4, 2006 in U.S. Appl. No. 11/255,146.

U.S. Official Action dated Nov. 17, 2006 in U.S. Appl. No. 11/255,146.

U.S. Official Action dated Aug. 22, 2007 un U.S. Appl. No. 11/255,146.

U.S. Notice of Allowance / Allowability dated Dec. 11, 2007 in U.S. Appl. No. 11/255,146.

U.S. Appl. No. 12/042,705, filed Mar. 5, 2008, entitled "Method, System, Apparatus, and Computer-Readable Medium for Taking and Managing Snapshots of a Storage Volume," Inventors: Chatterjee et al.

U.S. Appl. No. 12/042,710, filed Mar. 5, 2008, entitled "Method, System, Apparatus, and Computer-Readable Medium for Taking and Managing Snapshots of a Storage Volume," Inventors: Chatterjee et al.

U.S. Appl. No. 12/042,715, filed Mar. 5, 2008, entitled "Method, System, Apparatus, and Computer-Readable Medium for Taking and Managing Snapshots of a Storage Volume," Inventors: Chatterjee et al.

U.S. Appl. No. 11/695,673, filed Apr. 3, 2007, entitled "Snapshot-Assisted Data Replication," Inventors: Chatterjee et al.

U.S. Appl. No. 12/013,099, filed Jan. 11, 2008, entitled "Storage System Snapshots for Continuous File Protection," Inventors: Chatterjee et al.

U.S. Official Action dated May 6, 2010 in U.S. Appl. No. 12/042,715.
U.S. Official Action dated Jun. 9, 2010 in U.S. Appl. No. 12/042,705.
U.S. Official Action dated Jul. 8, 2010 in U.S. Appl. No. 12/042,710.
U.S. Official Action dated Jul. 8, 2010 in U.S. Appl. No. 12/013,099.
U.S. Official Action dated Oct. 8, 2008 in U.S. Appl. No. 11/254,347.
U.S. Official Action dated Dec. 1, 2010 in U.S. Appl. No. 12/042,705.

* cited by examiner

WRITABLE SNAPSHOTS FOR BOOT CONSOLIDATION

CROSS-REFERENCE TO RELATED APPLICATIONS

This application claims the benefit of U.S. provisional patent application No. 60/923,870, filed on Apr. 17, 2007, and entitled "Writeable Snapshots for Boot Consolidation" which is expressly incorporated herein by reference in its entirety.

BACKGROUND

In the data storage industry, snapshots have become a preferred method of protecting a data storage volume against inadvertent data loss and for performing background backups. A read-only snapshot is a non-writable volume that is a point-in-time image of a data storage volume that can be created, mounted, deleted, and rolled back onto the data storage volume arbitrarily. Such snapshots are utilized extensively in the data storage industry for security, backup, and archival purposes. A writeable snapshot is initially an image of a read-only parent snapshot. The writeable snapshot may be written to and modified without affecting the read-only parent snapshot. The writeable snapshot may be said to branch off of the read-only parent since modifications to the writable snapshot can cause the writable snapshot to diverge from the content of the read-only parent snapshot.

Boot consolidation allows multiple machines to boot from a single server or a single networked storage device. Snapshots can be used for boot consolidation by providing a separate snapshot on a server for each machine to boot from. To accomplish this, a single operating system installation may be performed and configured and then multiple snapshots of that single installation may be created. Each one of these multiple snapshots may then be used for booting the multiple slave machines.

Some operating systems, such as MICROSOFT WINDOWS and APPLE OS X, cannot boot from a read-only snapshot. In these cases, a writeable snapshot must be created from each read-only snapshot to allow the multiple machines to boot from the writeable snapshots. The writable snapshots share the data of their respective parent snapshots to start with, but as new writes occur at a given writable snapshot, a strict separation is maintained between that writable snapshot's data and the data of its read-only parent snapshot. The approach of creating a single volume with an operating system image, making multiple read-only snapshots of that single volume, and then making a writable snapshot of each of those read-only snapshots can provide the multiple writable snapshots needed for boot consolidation of multiple machines.

Conventionally, the implementation of volume snapshot systems cannot support the creation of further snapshots of a writable snapshot. Such a solution does not allow users of each of the writable snapshots to protect their own volumes by making snapshots of their writable snapshots.

Furthermore, the multiple read-only snapshots upon which the multiple writable snapshots depend are typically all identical to one another. Such identical replication of read-only snapshots may be considered a waste of resources. This is particularly true where the number of total volumes is limited or where installed operating systems or other software have an additional expense for each volume that they are installed on. Conventional volume snapshot systems cannot support multiple writable snapshots from a single read-only snapshot. This results in the requirement for replicating multiple read-only snapshots.

It is with respect to these considerations and others that the disclosure made herein is presented.

SUMMARY

Technologies are described herein for providing boot consolidation based on writable volume snapshots. Through the utilization of the technologies and concepts presented herein, flexible mappings of snapshot dependencies can be established by relating sequence numbers associated with various volume snapshots. A flexible arbitrary mapping can establish a more versatile arrangement than using a fixed, linear sequence, such as an arithmetic progression of sequence numbers. Providing for an arbitrarily complex mapping can establish support for a potentially unlimited number of writable snapshots in potentially any dependency configuration.

According to one aspect presented herein, extending writable snapshots through mapping can extend writable snapshots beyond a one-to-one limitation of one writable snapshot for each read-only snapshot. A generalized mapping approach can allow snapshots to be taken of other snapshots, including writable snapshots. Such mappings can be supported using a mapping table related to each volume. The mapping table can map sequence numbers arbitrarily into their relationship with volumes, read-only snapshots, and writable snapshots.

A mapping table can be traversed to locate the correct provision for a particular writable snapshot. During the traversal of the mapping table, sequence numbers that do not form part of the chain for the particular snapshot in question can be ignored. Provisions that do possess sequence numbers that may belong to the snapshot in question can have an ordering of sequence numbers as established by the mapping table.

Arbitrary mapping of snapshot sequence numbers can support a many-to-one relationship between writable snapshots and a read-only snapshot. This can relieve the requirement to create one thousand read-only snapshots to support one thousand writable snapshots for one thousand users because all of the writable snapshots can be made from a single read-only snapshot.

According to another aspect presented herein, pinned volumes may be supported. A pinned volume can be a writable snapshot that is uniquely associated with a particular sequence number related to another volume. While searching for a provision in order to perform an I/O, a pinned snapshot system can require continuing the dependency chain traversal beyond the pinned volume and into the base volume as well. A pinned volume can have all of the functionality of a normal volume. For example, a snapshot can be taken of a pinned volume, and writable snapshots can then be taken of those snapshots.

Yet another aspect presented herein can provide for system-wide updates. Such updates can allow security patches, upgrades, and application software to be applied or installed to a group of servers or a group of users in an efficient fashion. For example, the updates can be applied to only a single snapshot before intelligent upgrade agents operate to determine differences between various snapshots. The difference may then be applied in merge operations to upgrade any number of other related snapshots.

It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
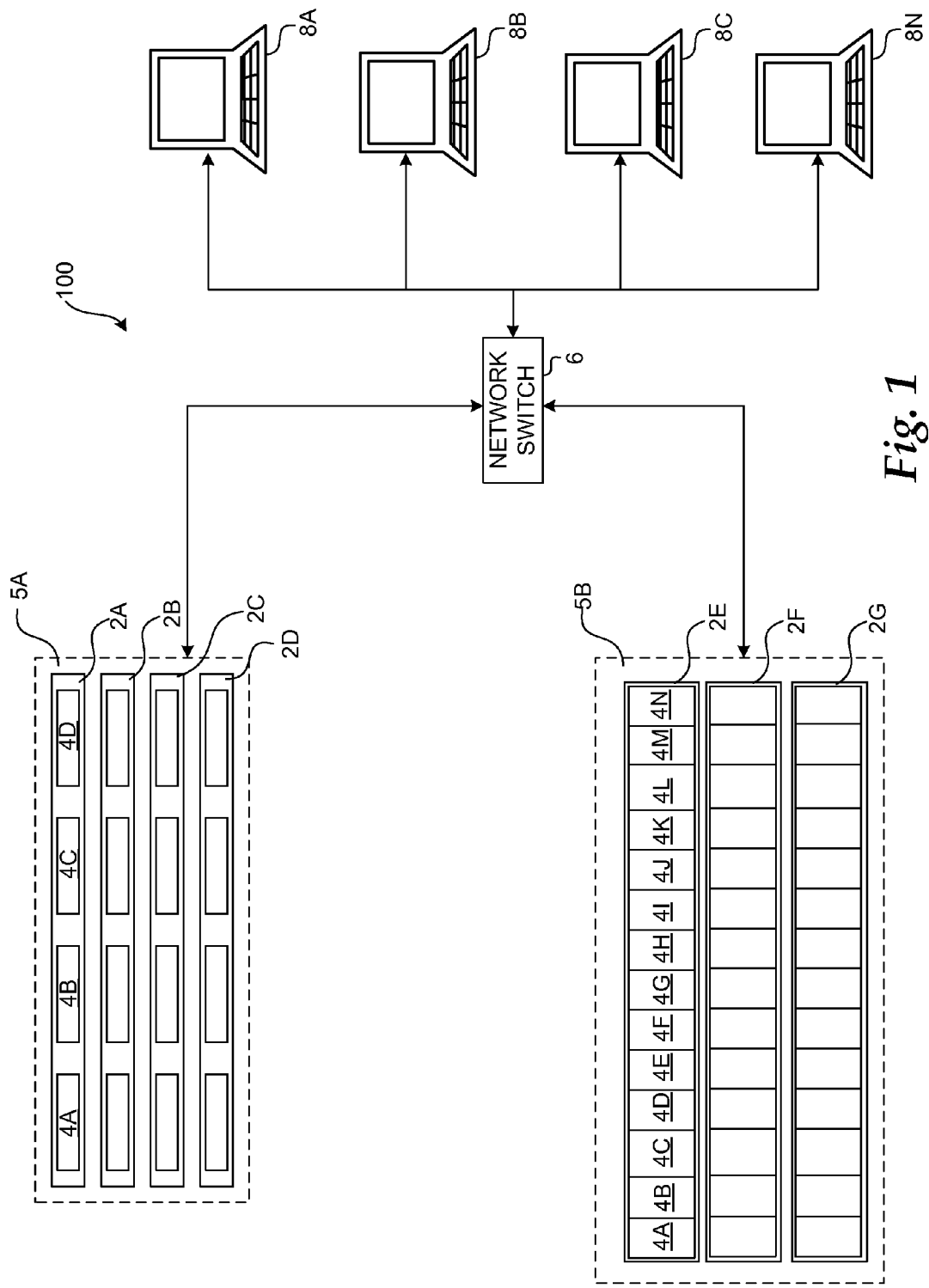
FIG. 1 is a network architecture diagram illustrating aspects of a storage system that includes several virtualized clusters according to one exemplary embodiment.

The following detailed description is directed to technologies for boot consolidation using writable volume snapshots. Through the use of the embodiments presented herein, writable snapshots can provide boot consolidation features with the aid of flexible snapshot relationship structures and system-wide update features.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration specific embodiments or examples. Referring now to the drawings, in which like numerals represent like elements through the several figures, aspects of a computing system and methodology for boot consolidation using writable volume snapshots will be described.

Turning now to FIG. 1, details will be provided regarding an illustrative operating environment for the implementations presented herein, as well as aspects of several software components that provide the functionality described herein for boot consolidation using writable snapshots. In particular, FIG. 1 is a network architecture diagram showing aspects of a storage system 100 that includes several virtualized clusters 5A-5B implementing thin provisioning. A virtualized cluster is a cluster of different storage nodes that together expose a single storage device. In the example storage system 100 shown in FIG. 1, the clusters 5A-5B include the storage server computers 2A-2G (also referred to herein as "storage nodes" or a "node") that are operative to read and write data to one or more mass storage devices, such as hard disk drives. The cluster 5A includes the nodes 2A-2D and the cluster 5B includes the nodes 2E-2G. All of the nodes 2 in a cluster 5 can be physically housed in the same rack, located in the same building, or distributed over geographically diverse locations, such as various buildings, cities, or countries.

According to implementations, the nodes within a cluster may be housed in a one rack space unit storing up to four hard disk drives. For instance, the node 2A is a one rack space computing system that includes four hard disk drives 4A-4D. Alternatively, each node may be housed in a three rack space unit storing up to fifteen hard disk drives. For instance, the node 2E includes fourteen hard disk drives 4A-4N. Other types of enclosures may also be utilized that occupy more or fewer rack units and that store fewer or more hard disk drives. In this regard, it should be appreciated that the type of storage enclosure and number of hard disk drives utilized is not generally significant to the implementation of the embodiments described herein. Any type of storage enclosure and virtually any number of hard disk devices or other types of mass storage devices may be utilized.

As shown in FIG. 1, multiple storage nodes may be configured together as a virtualized storage cluster. For instance, the nodes 2A-2D have been configured as a storage cluster 5A and the nodes 2E-2G have been configured as a storage cluster 5B. In this configuration, each of the storage nodes 2A-2G is utilized to field I/O operations independently, but are exposed to the initiator of the I/O operation as a single device. It should be appreciated that a storage cluster may include any number of storage nodes. A virtualized cluster in which each node contains an independent processing unit, and in which each node can field I/Os independently (and route them according to the cluster layout) is called a horizontally virtualized or peer cluster. A cluster in which each node provides storage but the processing and mapping is done completely or primarily in a single node, is called a vertically virtualized cluster.

Data may be striped across the nodes of each storage cluster. For instance, the cluster 5A may stripe data across the storage nodes 2A, 2B, 2C, and 2D. The cluster 5B may similarly stripe data across the storage nodes 2E, 2F, and 2G. Striping data across nodes generally ensures that different I/O operations are fielded by different nodes, thereby utilizing all of the nodes simultaneously, and that the same I/O operation is not split between multiple nodes. Striping the data in this manner provides a boost to random I/O performance without decreasing sequential I/O performance.

According to embodiments, each storage server computer 2A-2G includes one or more network ports operatively connected to a network switch 6 using appropriate network cabling. It should be appreciated that, according to embodiments of the invention, Ethernet or Gigabit Ethernet may be utilized. However, it should also be appreciated that other types of suitable physical connections may be utilized to form a network of which each storage server computer 2A-2G is a part. Through the use of the network ports and other appropriate network cabling and equipment, each node within a cluster is communicatively connected to the other nodes within the cluster. Many different types and number of connections may be made between the nodes of each cluster. Furthermore, each of the storage server computers 2A-2G need not be connected to the same switch 6. The storage server computers 2A-2G can be interconnected by any type of network or communication links, such as a LAN, a WAN, a MAN, a fiber ring, a fiber star, wireless, optical, satellite, or any other network technology, topology, protocol, or combination thereof.

Each cluster 5A-5B is also connected to a network switch 6. The network switch 6 is connected to one or more client computers 8A-8N (also referred to herein as "initiators"). It should be appreciated that other types of networking topologies may be utilized to interconnect the clients and the clusters 5A-5B. It should also be appreciated that the initiators 8A-8N may be connected to the same local area network ("LAN") as the clusters 5A-5B or may be connected to the clusters 5A-5B via a distributed wide area network, such as the Internet. An appropriate protocol, such as the Internet Small Computer Systems Interface ("iSCSI") protocol may be utilized to enable the initiators 8A-8D to communicate with and utilize the various functions of the storage clusters 5A-5B over a wide area network such as the Internet.

Two or more disks 4 within each cluster 5A-5B or across clusters 5A-5B may be mirrored for data redundancy and protection against failure of one, or more, of the disks 4. Examples of the disks 4 may include hard drives, spinning disks, stationary media, non-volatile memories, or optically scanned media; each, or in combination, employing magnetic, capacitive, optical, semiconductor, electrical, quantum, dynamic, static, or any other data storage technology. The disks 4 may use IDE, ATA, SATA, PATA, SCSI, USB, PCI, Firewire, or any other bus, link, connection, protocol, network, controller, or combination thereof for I/O transfers.

Figure 2:
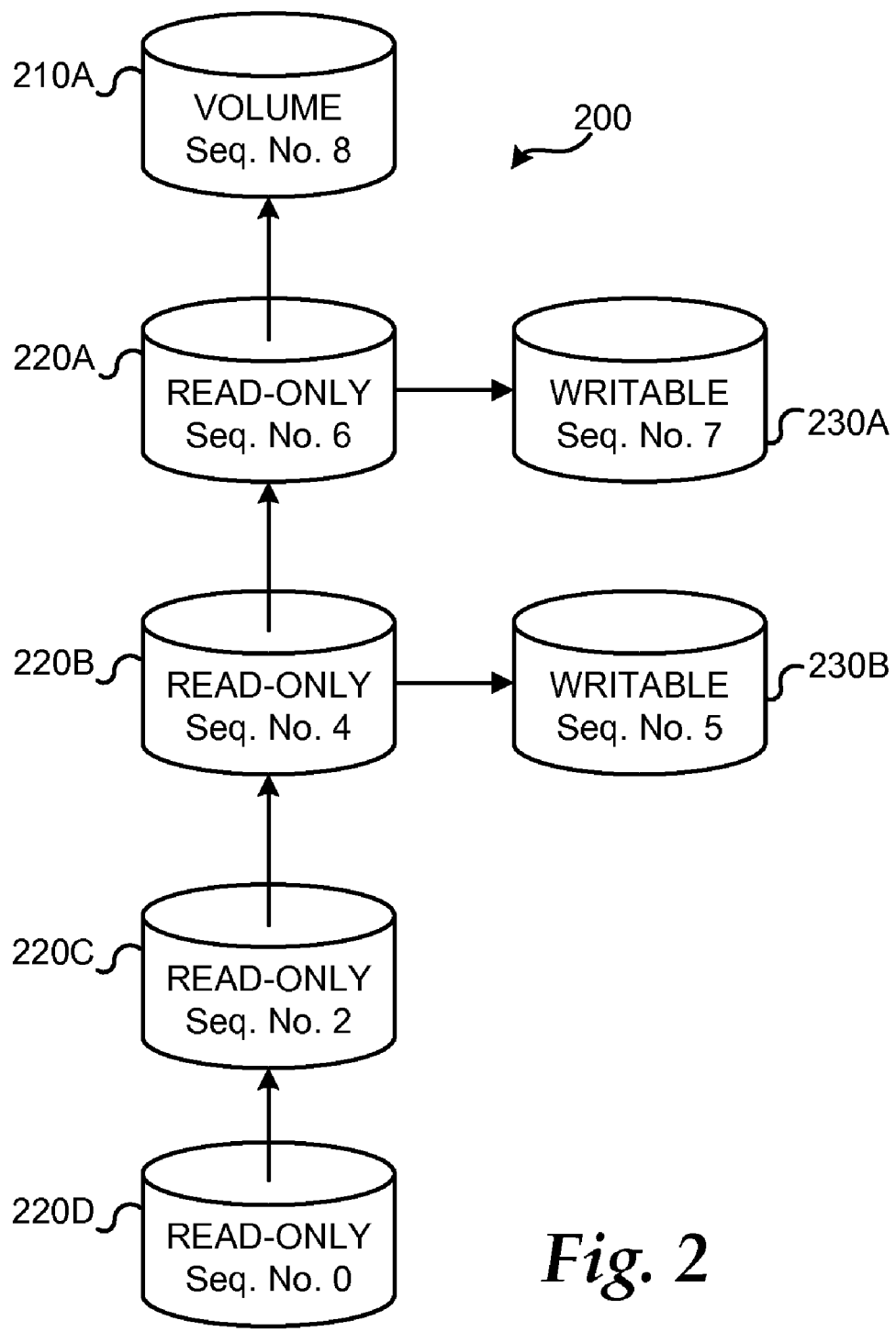
FIG. 2 is a snapshot system diagram illustrating writable snapshots created from read-only snapshots according to one exemplary embodiment.

Referring now to FIG. 2, a snapshot system 200 is illustrated where writable snapshots 230A-230B are created from read-only snapshots 220A-220D according to one exemplary embodiment. Snapshots may be taken of a data storage volume. A snapshot lifetime is the period of time that a particular snapshot is active. Each snapshot lifetime is uniquely associated with an increasing sequence number that identifies the snapshot lifetime. Writable snapshots are volumes that may be uniquely associated with a read-only snapshot. Writable snapshots may initially have the same data as their corresponding read-only snapshot, but the writable snapshot can be written to without affecting either the snapshot or the data volume.

The volume 210A has a sequence number of 8. A read-only snapshot 220A of the volume 210A has sequence number 6. That snapshot 220A has a read-only snapshot 220B having sequence number 4. Similarly, that snapshot 220B has a read-only snapshot 220C having sequence number 2. Finally down the chain, the snapshot 220C has a read-only snapshot 220D having sequence number 0.

The writable snapshot 230A having sequence number 7 is a snapshot of the read-only snapshot 220A having sequence number 6. Similarly, the writable snapshot 230B having sequence number 5 is a snapshot of the read-only snapshot 220B having sequence number 4.

The concept of a sequence number can be used to keep track of whether a storage provision belongs to a volume, snapshot or writable snapshot. A volume can begin by having sequence number 0, and any newly created snapshot can inherit the volume's sequence number while the volume's sequence number is incremented by two. Thus, if a volume has four snapshots associated from it, as does the volume 210A in FIG. 2, its sequence number is 8. The snapshots will then have sequence numbers 6, 4, 2 and 0.

A volume, and any read-only snapshots associated with it, can have even sequence numbers. The intervening odd sequence numbers may be reserved for writable snapshots. The writable snapshot corresponding to a particular read-only snapshot is assigned a sequence number that is one more than the sequence number of the read-only snapshot. Hence, in the example above, the snapshot 220B with sequence number 4 has an associated writable snapshot 230B with sequence number 5.

Writable snapshots may share the same provisions as snapshots with lower or equal sequence numbers but form independent branches (in a dependency tree) from the sequence numbers that are higher. In this manner, writable snapshots may create a branch off of a tree formed by the linked dependency structure. In order to read from a writable snapshot, therefore, the presence of higher sequence numbers can be ignored.

Figure 3:
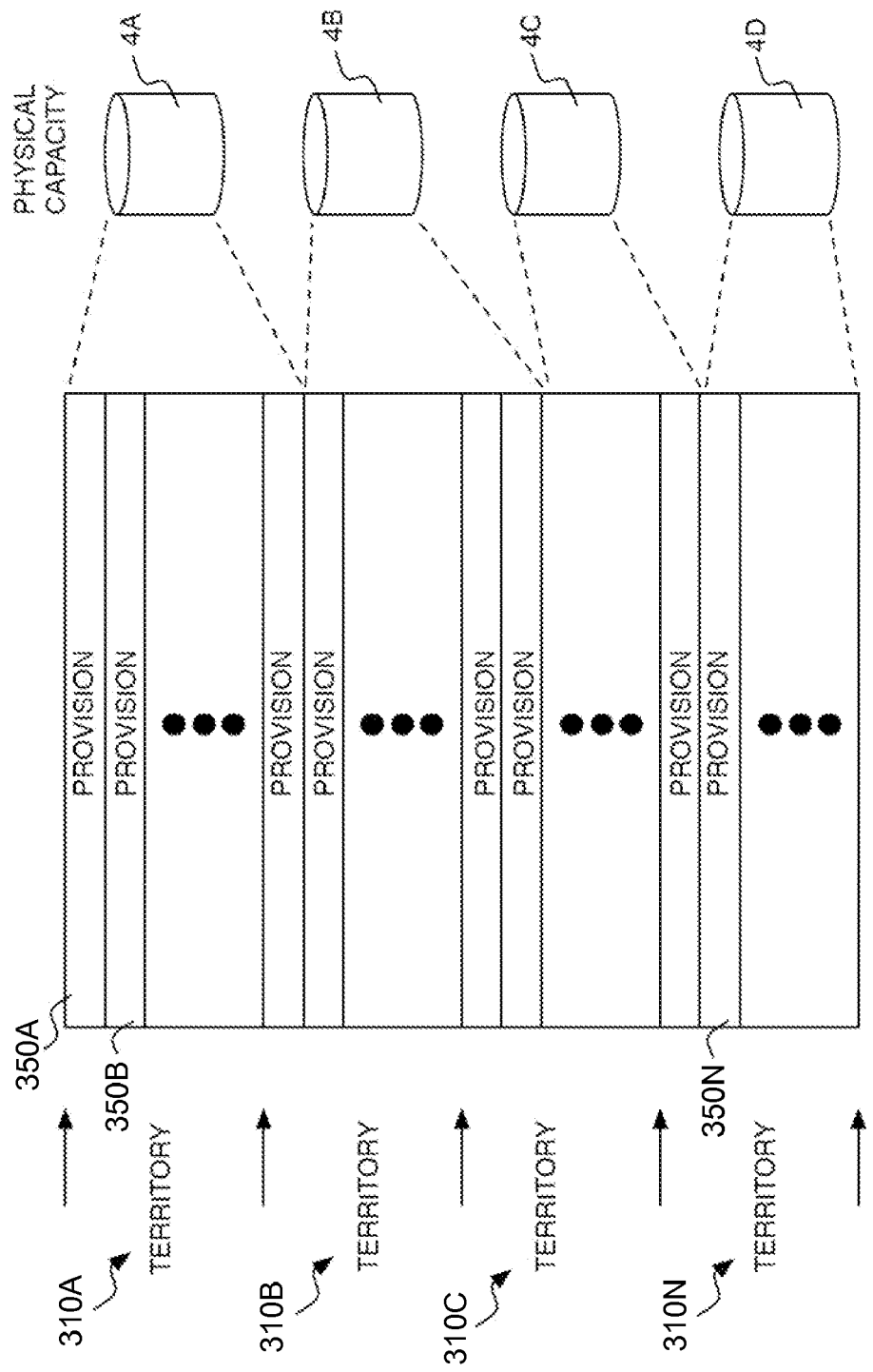
FIG. 3 is a data structure diagram illustrating the division of physical capacity of a storage server computer into provisions and territories according to one exemplary embodiment.

Referring now to FIG. 3, additional details regarding the division of the physical capacity of the storage server computer 2 into provisions 350A-350N and territories 310A-310N will be provided. As shown in FIG. 3, the available physical capacity of the computer 2 is made up of a number of hard disk drives 4A-4D. It should be appreciated that other storage nodes connected to the computer 2 may also contribute physical capacity to the available physical capacity of the computer 2. The available physical capacity can be divided into a number of unique, equally sized areas, called territories 310A-310N. According to embodiments, the size of a territory may be one gigabyte ("GB"). However, it should be appreciated that territories of other sizes may be utilized.

The available physical capacity may be further subdivided into units referred to herein as provisions 350A-350N. The provisions 350A-350N can comprise unique, equally sized areas of the available physical capacity. As one example, the provisions 350A-350N may be one megabyte ("MB") in size. It should be appreciated that provisions of other sizes may also be utilized.

Figure 4:
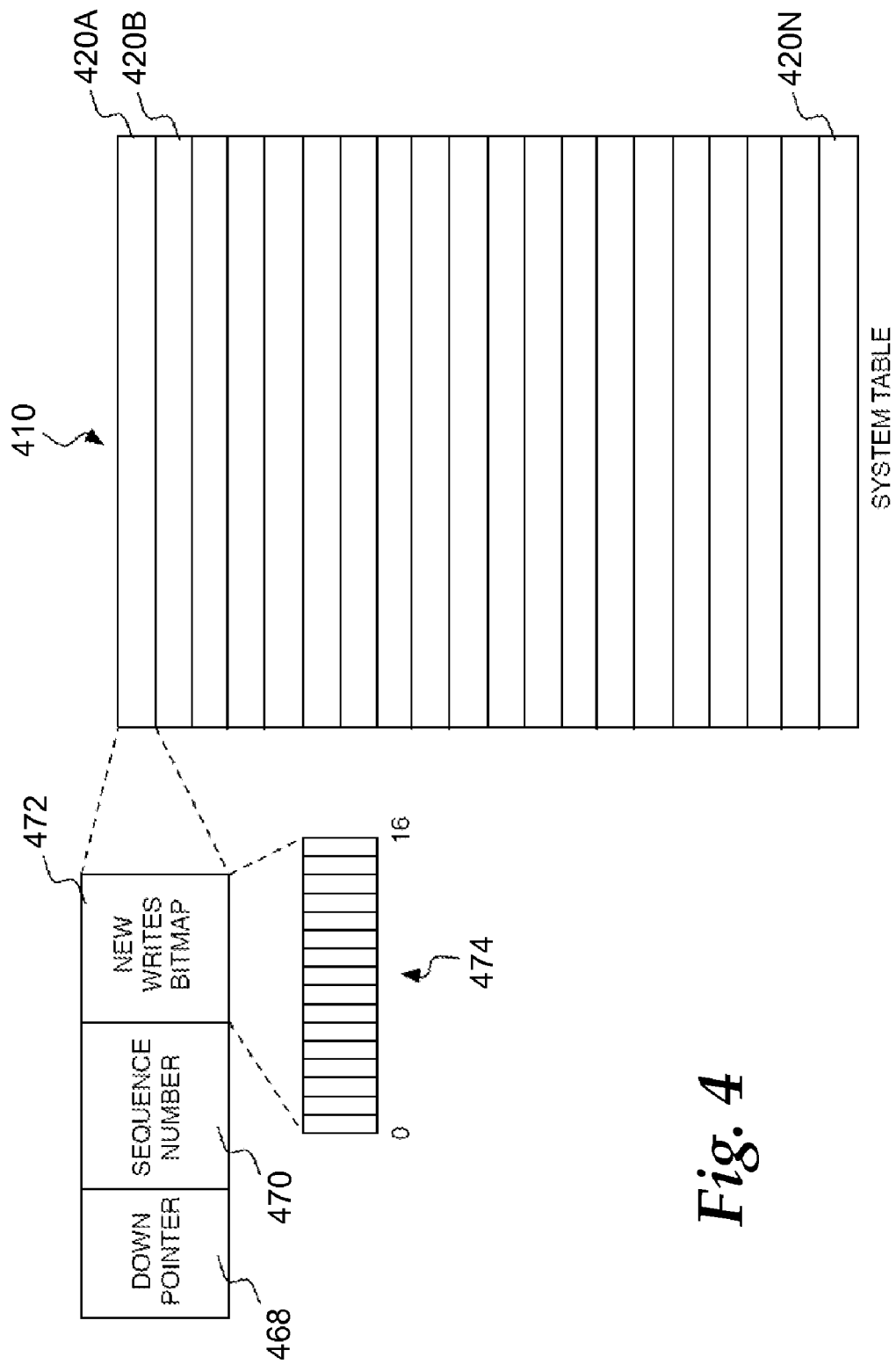
FIG. 4 is a data structure diagram illustrating the structure and use of a system table according to one exemplary embodiment.

Turning now to FIG. 4, additional details regarding the structure and use of a system table data structure provided by embodiments are described. In particular, FIG. 4 illustrates a system table 410 provided by and utilized in embodiments discussed herein. The system table 410 includes a number of entries 420A-420N, each of which can be mapped to a unique portion of the available physical storage of the computer 2. If additional physical storage is made available to the computer 2, then additional entries may be added to the system table 410 that correspond to portions of the newly added storage. According to embodiments, each of the entries 420A-420N in the system table 410 can correspond to a provision 350A-350N within the available physical storage space of the computer 2.

Each entry 420A-420N in the system table 410 contains a number of data fields. For example, each entry may include a down pointer field 468, a sequence number field 470, and a new writes bitmap field 472. Each of the fields in the system table can be utilized when the computer 2 is accessed to allocate physical storage space or to provide snapshots. In particular, the sequence number field 470 is utilized to specify the snapshot lifetime that a particular provision is allocated in.

The down pointer field 468 can be utilized to store a pointer to another entry in the system table 410. This down pointer can identify the next physical provision belonging to the same volume and with the same logical provision number. The down pointer field 468 can be utilized to create a linked list of system table 410 entries from which the data for any provision during any snapshot lifetime can be stored and recreated. The new writes bitmap field 472 is utilized to store a bitmap 474 that indicates whether each chunk of the provision is valid or whether newer data exists for the chunk in another provision. According to one example, a chunk may comprise a one-sixteenth portion of the provision. According to an example with 1 MB provisions, a chunk can comprise a 64 kilobyte ("kB") area. It should be appreciated that the provisions may be divided into chunks of different sizes and that more or fewer bits may be utilized in the bitmap 474 to indicate the portions of a provision that contain valid data for a snapshot lifetime. In this manner, the system table 410 can provide information regarding each provision in the storage computer 2.

The system table 410 may be maintained by the computer 2 and stored in the main memory 54 of the computer 2 for fast access. However, it should be appreciated that the entire system table 410 may not be stored in the main memory 54 at one time.

A map called the volume table (VT) can be stored in memory to direct each I/O to an entry in a system table 410 called a system volume table (SVT). The SVT can track provisions as units of allocation within volumes on the server. A volume and its various snapshots can all be allocated different provisions 350. The SVT entries corresponding to these provisions can be linked together by down pointers 468. By tracking the down pointers 468 of a particular provision 350, the system can identify which SVT entry in the chain is associated with a particular snapshot. From this entry, it may be possible to find the exact location of the data corresponding to that snapshot or writable snapshot on the underlying physical disks 4.

The provisions 350 corresponding to all sequence numbers 470 of a particular volume and its snapshots are linked together in the chain of down pointers 468. To reduce CPU load and enhance performance, it may be possible to reorder the chain so that the volume is always on top, and the most frequently used snapshots are just below it. Any other efficient ordering may also be established.

Each entry in a volume table can be utilized to store a pointer to a territory 310 in the system table 410. The pointer is created when physical space for the logical territory in the volume is allocated. For instance, a first write request may be received that is directed to the territory referenced by the entry of the volume table. In response to the request, physical space may be allocated by creating a pointer in the entry to the next available territory 310 in the system table 410. In this manner, physical space is allocated for logical territories 310 within volumes on an as needed basis.

It should be appreciated that the territories 310 within a volume may also be allocated from storage devices connected to different hosts. For instance, storage for the even numbered territories 310 within a volume may be allocated from physical devices connected to a first node 2, while storage for the odd numbered territories 310 within the volume may be allocated from physical devices connected to a second node 2. Allocating storage for territories 310 in this manner can improve I/O performance.

When read operations are received, it is necessary to utilize both the volume table for the corresponding logical volume and the system table 410 to perform the read operation. In particular, the appropriate volume table is examined to determine the location within the system table 410 that refers to the territory 310 where the requested data is stored. From the system table 410, the start of the physical location containing the requested territory 310 can be determined. The offset within the particular territory 310 can then be utilized to locate the actual data.

It should be appreciated that new entries may be added to each of the volume tables, thereby allowing the logical volumes to grow to any size within the available physical capacity. Moreover, it should be appreciated that because the size of logical volumes is only limited by the available physical storage space, it is unnecessary to define the size of the logical volumes in advance. Alternatively, the logical volumes may be defined as any size, even sizes larger than the available physical capacity. This is possible because physical space is allocated only as needed.

Figure 5:
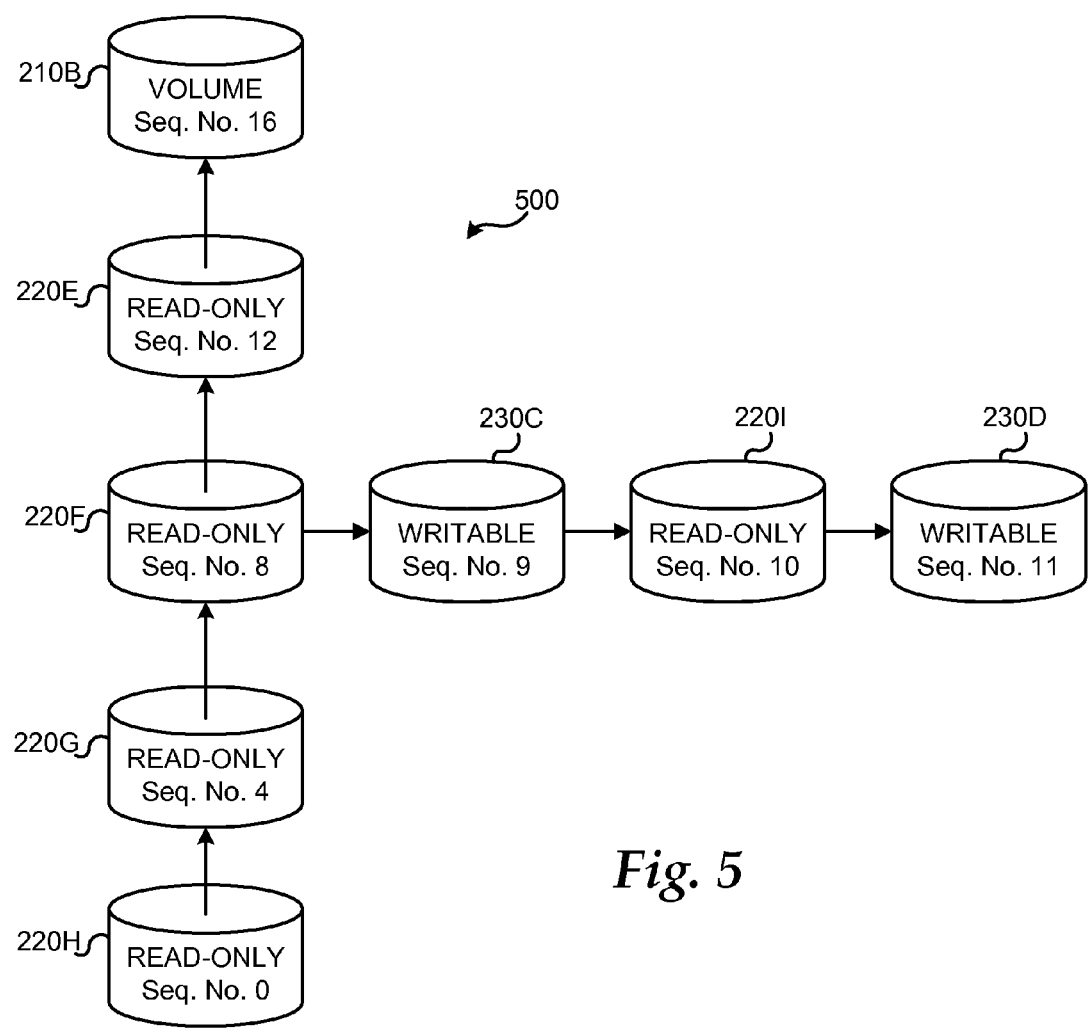
FIG. 5 is a snapshot system diagram illustrating the extension of writable snapshots according to one exemplary embodiment.

Referring now to FIG. 5, a volume snapshot structure 500 used in extending writable snapshots is illustrated according to one exemplary embodiment. In particular, FIG. 5 illustrates a sequence number allocation technique having larger spacing in the sequence numbers of the volume and read-only snapshots. The read-only snapshots 220E-220H of the volume 210B have sequence numbers 0, 4, 8, and 12 with a spacing that skips three between each sequence number instead of skipping only one. Such extended sequence number spacing allows for three snapshots to be made of each read-only snapshot 220E-220H. For example, the read-only snapshot 220F with sequence number 8 has a dependent writable snapshot 230C with sequence number 9. There is a read-only snapshot 2201 with sequence number 10 created from the writable snapshot 230C. This read-only snapshot 2201 may be an instantaneous back-up of the writable snapshot 230C. There is also a writable snapshot 230D having sequence number 11 that has been created from the read-only snapshot 220I having sequence number 10. That is, the three snapshots with sequence numbers 9, 10, and 11 have been created directly or indirectly from the original read-only snapshot 220F with sequence number 8. The extended spacing of the sequence numbers affords the necessary space for these three dependent snapshots.

In the general case, a volume may start off having sequence number 0 and then increment the sequence number by 4 for every snapshot generated. This can allow three intervening snapshots to be created between, for example, the sequence numbers 0 and 4. Of these three sequence numbers, it is possible to have 1 reserved for a writable snapshot, to reserve 2 as a read-only snapshot of 1, and to reserve 3 as a writable snapshot of 2. It is also possible to have any combination of any (three or fewer) other types of snapshots. In a similar way, it is possible to extend the sequence numbering to support a large number of nested and non-nested writable snapshots. For example, the spacing may be extended from 4 to 5, 6, or more.

Figure 6:
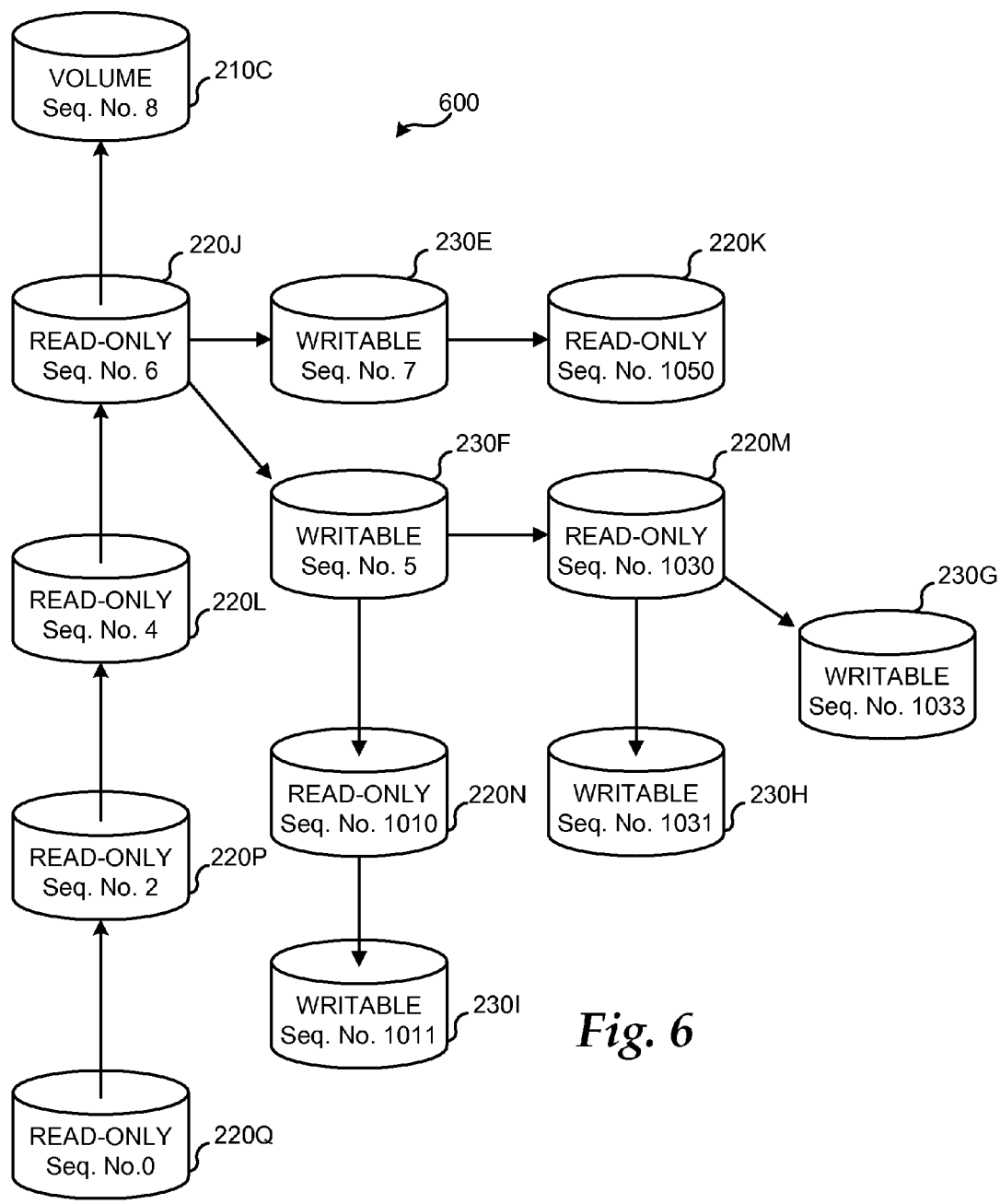
FIG. 6 is a snapshot system diagram illustrating the extension of writable snapshots through flexible mapping according to one exemplary embodiment.

Referring now to FIG. 6, a volume snapshot structure used in extending writable snapshots through flexible mapping is illustrated according to one exemplary embodiment. In particular, FIG. 6 illustrates the flexibility available to an arbitrary mapping amongst allocated sequence numbers. By removing a strict arithmetic relationship and replacing it with a table-based relationship of sequence numbers, it can be possible to support potentially unlimited writable snapshots, in potentially any configuration.

One example mechanism for supporting this flexible mapping is with a mapping table. A table can map sequence numbers flexibly into their relationship with volumes, read-only snapshots, and writable snapshots.

In the example illustrated in FIG. 6, the volume 210C has a sequence number of 8. The snapshots 220J, 220L, 220P, and 220Q of the volume 210C have sequence numbers 0, 2, 4 and 6. Writable snapshots 230E-230F having sequence numbers 7 and 5 are mapped to the read-only snapshot 220J having sequence number 6. Thus, multiple writable snapshots 220E-220F may be created from the same read-only snapshot 220J. Two read-only snapshots 220M-220N having sequence numbers 1030 and 1010 were created based on the writable snapshot 230F having sequence number 5. Thus read-only snapshots of writable snapshots can be supported. The sequence number ordering amongst a subgroup of read-only snapshots may still use arithmetic ordering.

The read-only snapshot 220K having sequence number 1050 was created from writable snapshot 230E having sequence number 7. The writable snapshot 230I having sequence number 1011 was created from read-only snapshot 220N having sequence number 1010. The writable snapshots 230G-230H having sequence numbers 1033 and 1031 are both based on the read-only snapshot 220M having sequence number 1030.

The relationships between all of the sequence numbers can be established and maintained in a table. Examples of such a table are discussed in further detail with respect to FIG. 7.

Figure 7:
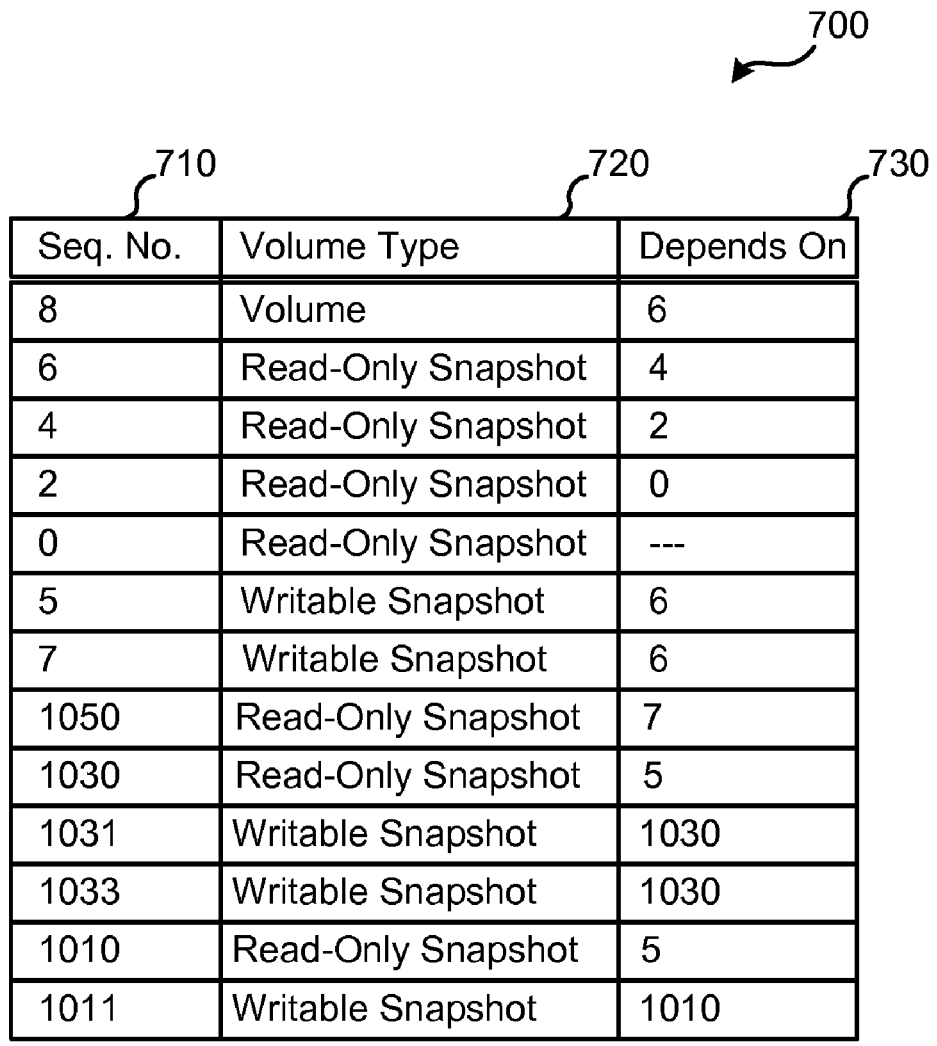
FIG. 7 is a data structure diagram illustrating a sequence number table for establishing flexible snapshot relationships according to one exemplary embodiment.

Referring now to FIG. 7, a sequence number mapping table for establishing flexible snapshot relationships is illustrated according to one exemplary embodiment. In particular, FIG. 7 illustrates a flexible mapping of sequence numbers that can be established using a table 700 or similar data structure to maintain snapshot relationships.

As one example, the illustrated mapping table 700 can store several entries. There can be one entry for each snapshot, volume, read-only snapshot, or writable snapshot. Each entry may contain three pieces of information represented by the three columns of the table 700. A first column 710 can store a sequence number. A second column can store a volume type. A third column can store a dependency which can be the sequence number of the snapshot or volume from which the snapshot was taken. The values stored in the example illustrated table correspond to the mapping illustrated in FIG. 6.

The table 700 can be used to identify the desired sequence number for any given I/O operation. While traversing a chain to locate the correct provision for a particular writable snapshot, all sequence numbers that do not form part of the chain for that particular snapshot can be ignored. Within provisions that do possess sequence numbers that may belong to the snapshot in question, the ordering of sequence numbers can be determined from the table. It is possible to have any arbitrary relationship between the sequence numbers and therefore to define any number of independent and dependent read-only and writable snapshots for a volume.

Figure 8:
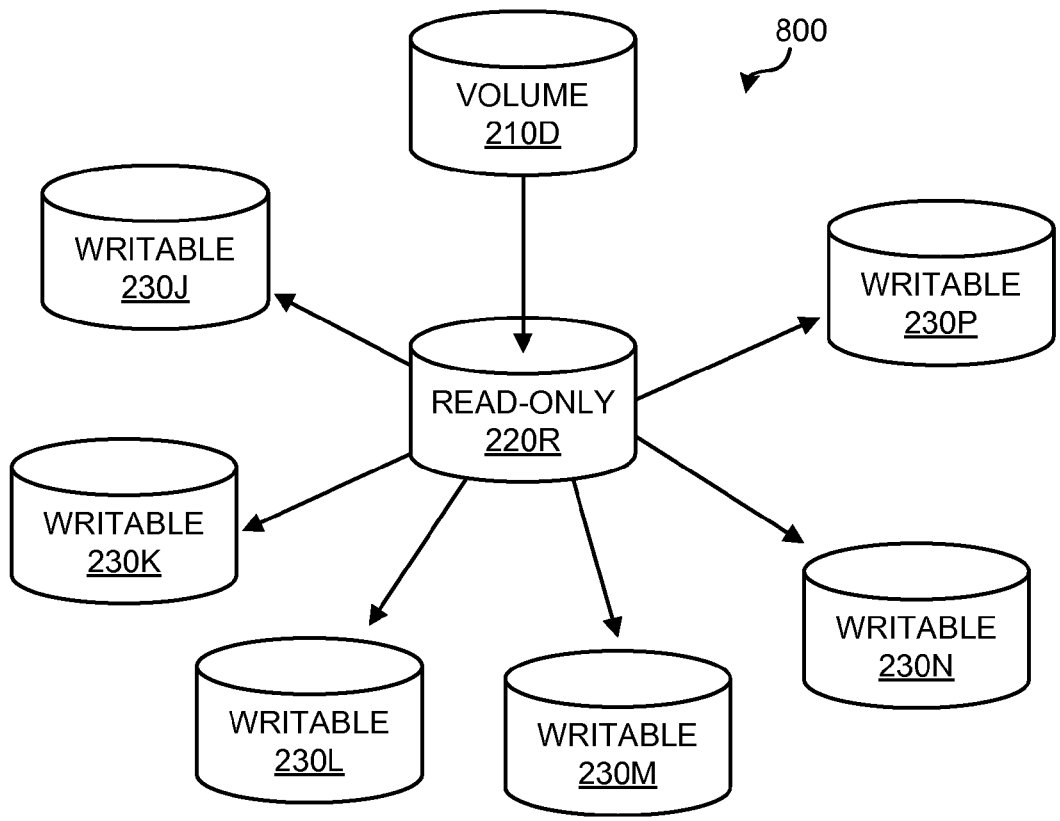
FIG. 8 is a snapshot system diagram illustrating a many-to-one mapping according to one exemplary embodiment.

Referring now to FIG. 8, a volume snapshot structure 800 with a many-to-one mapping is illustrated according to one exemplary embodiment. In particular, FIG. 8 illustrates a set of snapshot relationships where several writable snapshots 230J-230P are based on a single read-only snapshot 220R. The read-only snapshot 220R is based on the original volume 210D. The writable snapshots 230J-230P could also have been built directly off of the volume 210D or any arbitrary chain of snapshots. Such an flexible set of relationships, including many-to-one relationships, may be built upon the snapshot mapping approach discussed with respect to FIG. 6 and FIG. 7.

In addition to providing tremendous flexibility in creating all possible configurations of writable snapshots, a many-to-one relationship between writable snapshots and a read-only snapshot can be established. This can be accomplished when multiple writable snapshots branch from a single read-only snapshot. Traversing the down pointers through any of these writable snapshots leads eventually to the same read-only snapshot's provision. Hence, it may not be required to create a thousand read-only snapshots every time the user needs one thousand writable snapshots. This can be important in various virtualized hosting systems.

In particular, a many-to-one relationship such as structure 800 can be used in a boot consolidation system. In this example, the read-only snapshot 220R could have been configured as desired by the system administrator who could then create several writable snapshots 230J-230P. One each of the several writable snapshots 230J-230P could then be used by each user system as it boots from the storage server 2.

Figure 9:
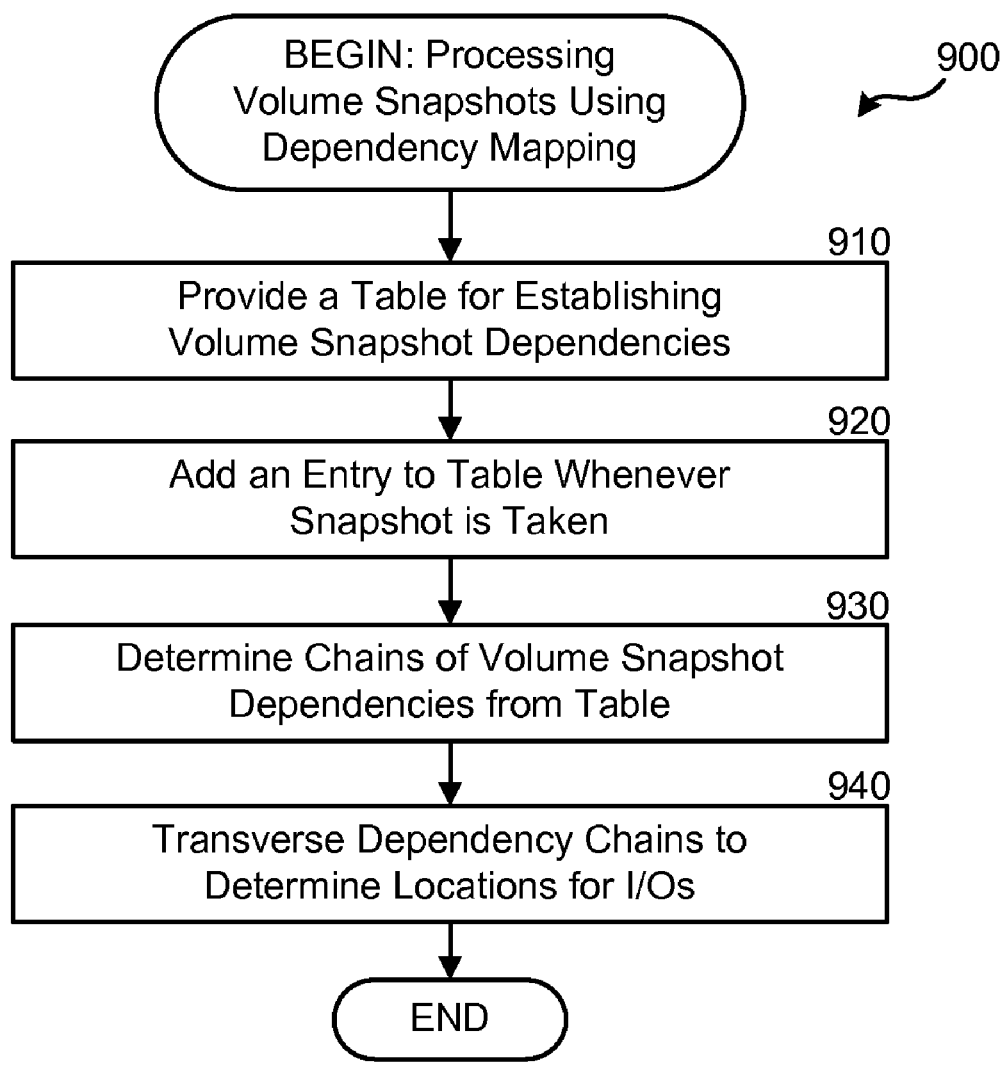
FIG. 9 is a logical flow diagram illustrating a process for managing volume snapshots using dependency mapping according to one exemplary embodiment.

Turning now to FIG. 9, additional details will be provided regarding the embodiments presented herein for boot consolidation using writable snapshots. In particular, FIG. 9 is a flow diagram showing a routine 900 that illustrates aspects of an exemplary process performed by a storage server 2 for processing volume snapshots using dependency mapping. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in parallel, or in a different order than those described herein.

The routine 900 can begin with operation 910 where a table 700 is provided for establishing volume snapshot dependencies. The table 700 can be maintained within the storage server 2 in order to record the dependency list for each snapshot. That is, what volume or snapshot that a given snapshot was taken from, and then what volume or snapshot that the parent snapshot was taken from, that then its parent, and so forth in a chain.

In operation 920 of the routine 900, an entry can be added to the table 700 when a new snapshot is created. The entry can contain various information about the newly created snapshot including its sequence number and what sequence number it was created from. In operation 930, a chain of dependencies can be maintained within the table 700 as discussed with respect to operation 910. These dependency chains can be established from the list specifying the sequence number that each snapshot was taken from.

In operation 940, the routine 900 can traverse the snapshot dependency chains established in operation 930. The snapshot dependency chains may be traversed to determine the specific sequence through which one snapshot was created from another. Such relative snapshot dependency may be used in I/O operations, in the creation or deletion of snapshots, or in any other snapshot processing function. The routine 900 can terminate after operation 940.

Figure 10:
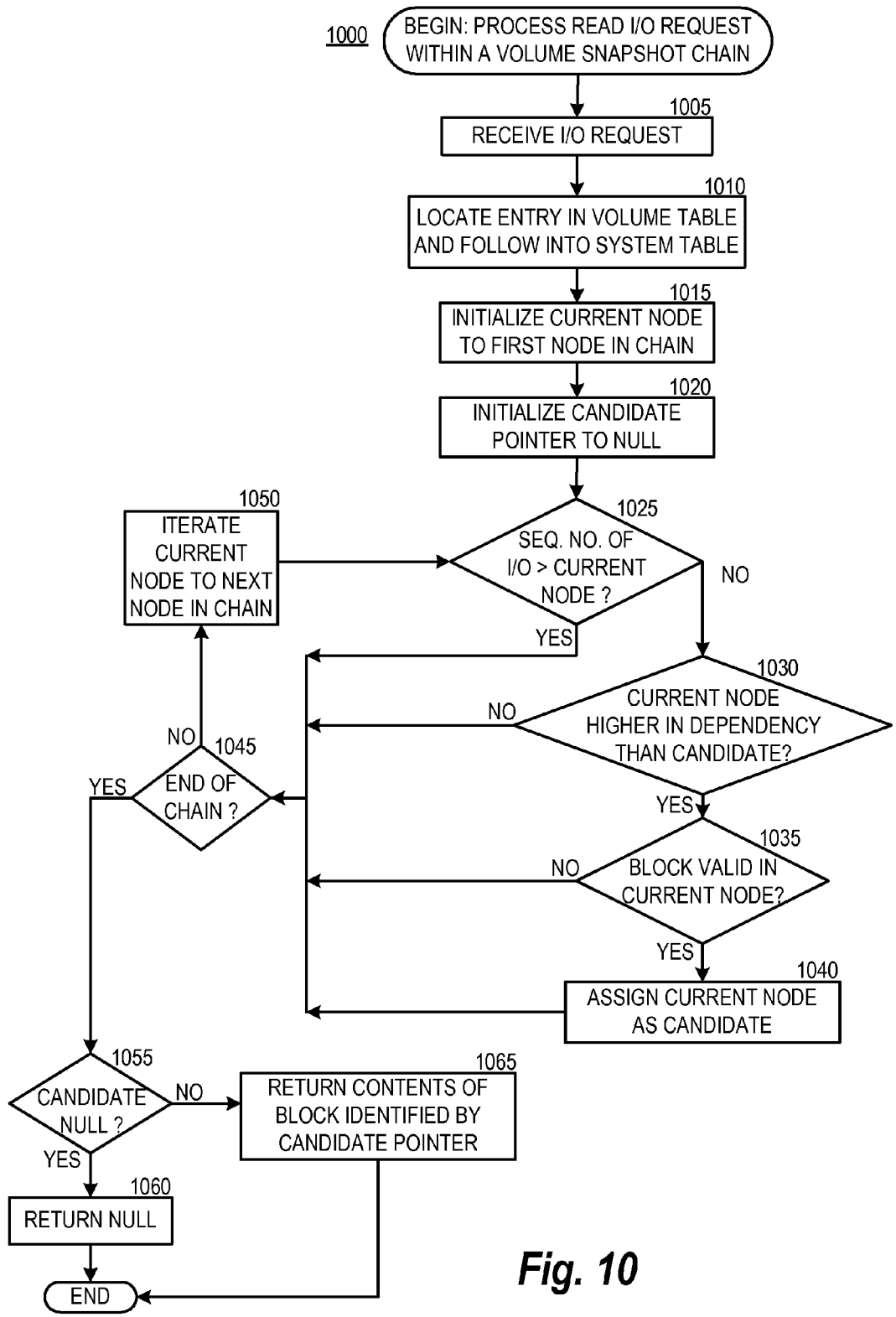
FIG. 10 is a logical flow diagram illustrating a process for managing read requests directed to a current volume or a snapshot according to one exemplary embodiment.

Referring now to FIG. 10, an illustrative routine 1000 will be described for processing read requests directed to the current volume or a snapshot. The routine 1000 begins at operation 1005, where the read request is received. The routine 1000 then continues to operation 1010 where the start of the linked list for the provision to be read from is located using the volume table and system table in the manner described above. From operation 1010, the routine 1000 continues to operation 1015 where the current node is initialized as the first node in the linked list. In operation 1020, the read candidate pointer can be initialized to NULL. This pointer can be used to track the current best candidate for satisfying the data read request.

From operation 1020, the routine 1000 continues to decision operation 1025 where a determination is made as to whether the sequence number for the pending read request is greater than the current sequence number. The current sequence number is either the sequence number for the current volume or for the snapshot to read from. If the current node is identified at operation 1025 that has a sequence number less than or equal to the current sequence number, the routine 1000 can continue from operation 1025 to operation 1030. At operation 1030, it can be determined if the current node is higher in dependency than the current read candidate. If operation 1030 determines that the current node is higher, the routine 1000 can continue to operation 1035. At operation 1035, a determination is made utilizing the bitmap field of the current node as to whether the provision identified by the node contains valid data for the requested chunk. If the provision does contain valid data, the routine 1000 continues from operation 1035 to operation 1040. At operation 1040, the read candidate pointer can be assigned to the current node since the current node has been determined to be the most likely node to satisfy the read request among all of the nodes iterated thus far.

The routine 1000 can continue from operation 1040 to operation 1045. Operation 1045 may also be reached after operation 1025 if the sequence number of the I/O is greater than that of the current node. Operation 1045 may also be reached after operation 1030 if the current node is not higher in dependency than the current candidate. Operation 1045 may also be reached after operation 1035 if the data block is not valid in the current node. From any of these four sources operations, operation 1045 can determine if there are additional nodes in the linked list to be iterated. If additional nodes do exist in the list, the routine 1000 continues to operation 1050, where the next node in the list is designated as the current node. The routine 1000 then continues from operation 1050 to operation 1025 where the processing described above takes place using the new current node. If instead, operation 1045 determines that the end of the chain of nodes has been reached, the routine 1000 can continue to operation 1055.

At operation 1055, the candidate pointer can be examined to determine if an actual candidate was found to satisfy the read. If the read candidate pointer is still NULL then no read candidates were identified. If no read candidate was found, the routine 1000 can continue to operation 1060 where the read operation returns a NULL. If instead, operation 1055 identifies that the read candidate pointer is not NULL, the routine 1000 can proceed to operation 1065. At operation 1065, the read operation can be performed on the provision identified by the read candidate pointer. The routine 1000 may terminate after operation 1060 or operation 1065. In this manner, the linked list for the requested provision may be iterated (or traversed) to find the provision having a closest sequence number less than or equal to the current or snapshot provision number in the dependency chain where the provision found also has valid data for the requested block.

Similar to processing read I/Os, when a write request is received, a determination can be made as to whether physical space was previously allocated for the territory in which the write is to be made. If physical space has not yet been allocated, a new pointer can be created in the volume table for the volume directed toward an entry in the system table for an available territory. The requested write operation can then be performed.

If it is determined that physical space was previously allocated for the territory to be written, the entry in the volume table for the provision to be written can be utilized to locate the head of the linked list in the system table. A determination can then be made as to whether there exists a provision associated with the logical address with a sequence number that is equal to the current sequence number for this particular volume. If the sequence number for the provision is not current, a new snapshot provision can be allocated for the current sequence number. If the sequence number for the provision is current, a determination can be made as to whether the chunk to be written is valid in the current provision. If the chunk is valid, the chunk can be written. If the chunk is not valid, a determination can be made as to whether the data to be written to the chunk is a full chunk or a sub-portion of a chunk. If the portion to be written is a full chunk, no data needs to be migrated from the previous snapshot lifetime in which the chunk was valid. Accordingly, the full chunk can be written. If the portion is a sub-chunk portion, a read-modify-write operation can be performed to migrate the data from the provision in which the chunk was previously valid.

Figure 11:
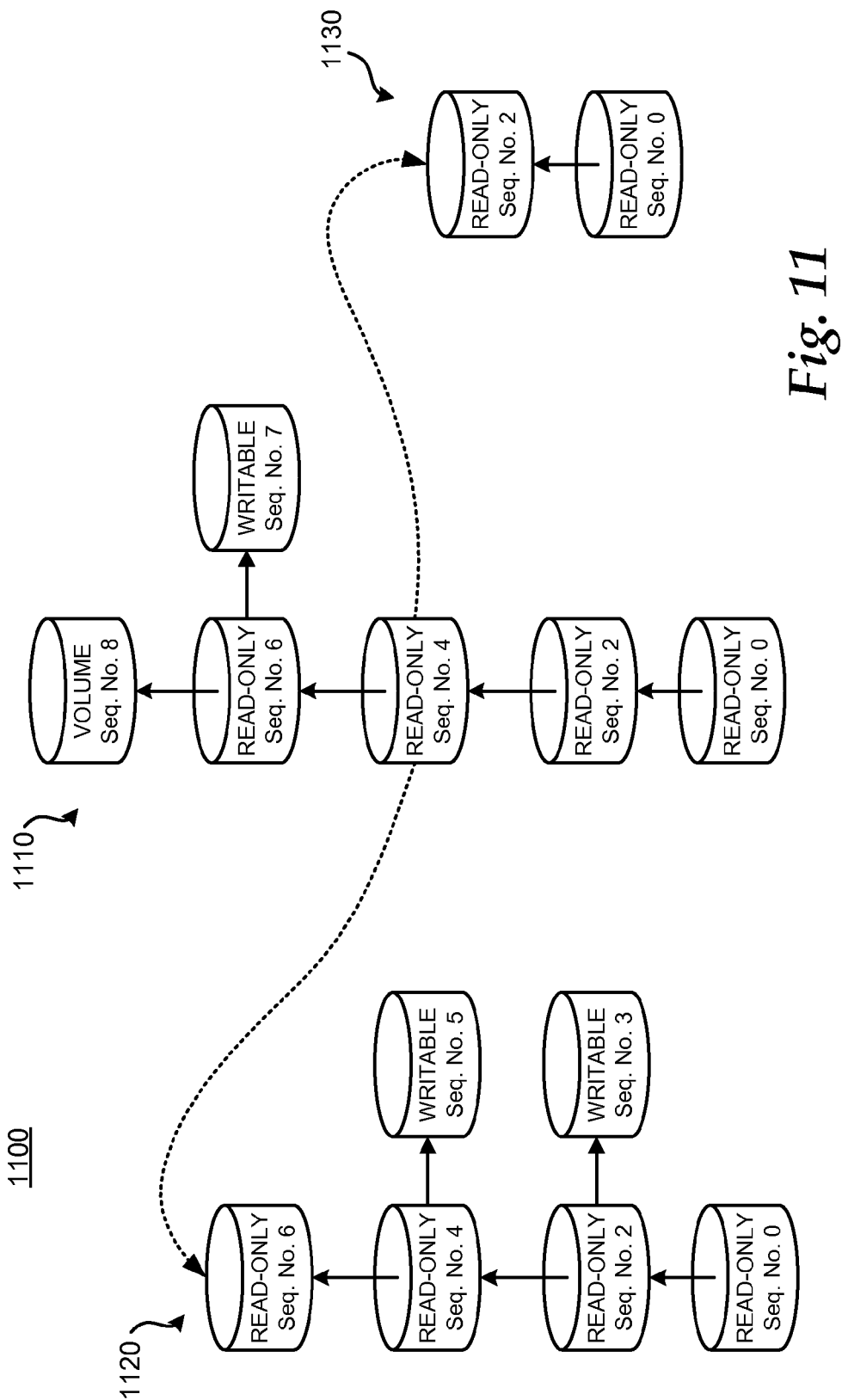
FIG. 11 is a snapshot system diagram illustrating volume pinning according to one exemplary embodiment.

Referring now to FIG. 11, a volume snapshot structure 1100 using volume pinning is illustrated according to one exemplary embodiment. In particular, FIG. 11 illustrates two pinned volumes 1120-1130 that are uniquely associated with (or pinned to) a specific sequence number of another volume 1110.

A pinned volume may start with a writable snapshot or a read-only snapshot that is uniquely associated with a particular sequence number of another volume. Additional snapshots can be created in association with the pinned volume as though it were an entirely separate volume. A pinned volume can have its own volume table and its own SVT entries. A pinned volume can have all of the functionality that a normal volume would. For example, it is possible to take snapshots of a pinned volume, and it is also possible to take writable snapshots of those snapshots.

While locating a provision to read data from a pinned volume, the chain traversal can continue beyond the pinned volume into its base volume as well. For example, a read I/O from the snapshot sequence number 0 in pinned volume 1130 may continue up through the chain of volume 1130 as usual to the read-only snapshot having sequence number 2. However, after traversing volume 1130 the traversal can continue through the pinning link into volume 1110 at the read-only snapshot having sequence number 4 and then up through the dependency chain of volume 1110. While each pinned volume can perform as an entirely separate volume, the base of the volume can extend, in dependency, into the snapshot of the volume to which it is pinned.

Any sequence number allocation mechanism can be used in conjunction with a volume pinning system. For example, arithmetically sequenced sequence numbers (0, 2, 4, 6, . . . ), or sequence number dependency mapping, or any other such technique can be used. However, the relationships between pinned volumes and their parent (or root) volumes must also be maintained. This can be accomplished in various ways. For example, the pinning relationships can be stored along with each pinned volume such as stored in a specific data field, encoded into the pinned volume's name, maintained in a system-wide table, or otherwise.

Volume pinning can be particularly useful in a boot consolidation system where it may be most important to have a single read-only snapshot from which many writable snapshots are based. In such a system, there may be limited need for maintaining more than one layer of writable snapshots under the first layer of snapshots. Using volume pinning in a snapshot system with these general boot consolidation requirements may provide a seamless mechanism with minimal overhead.

Figure 12:
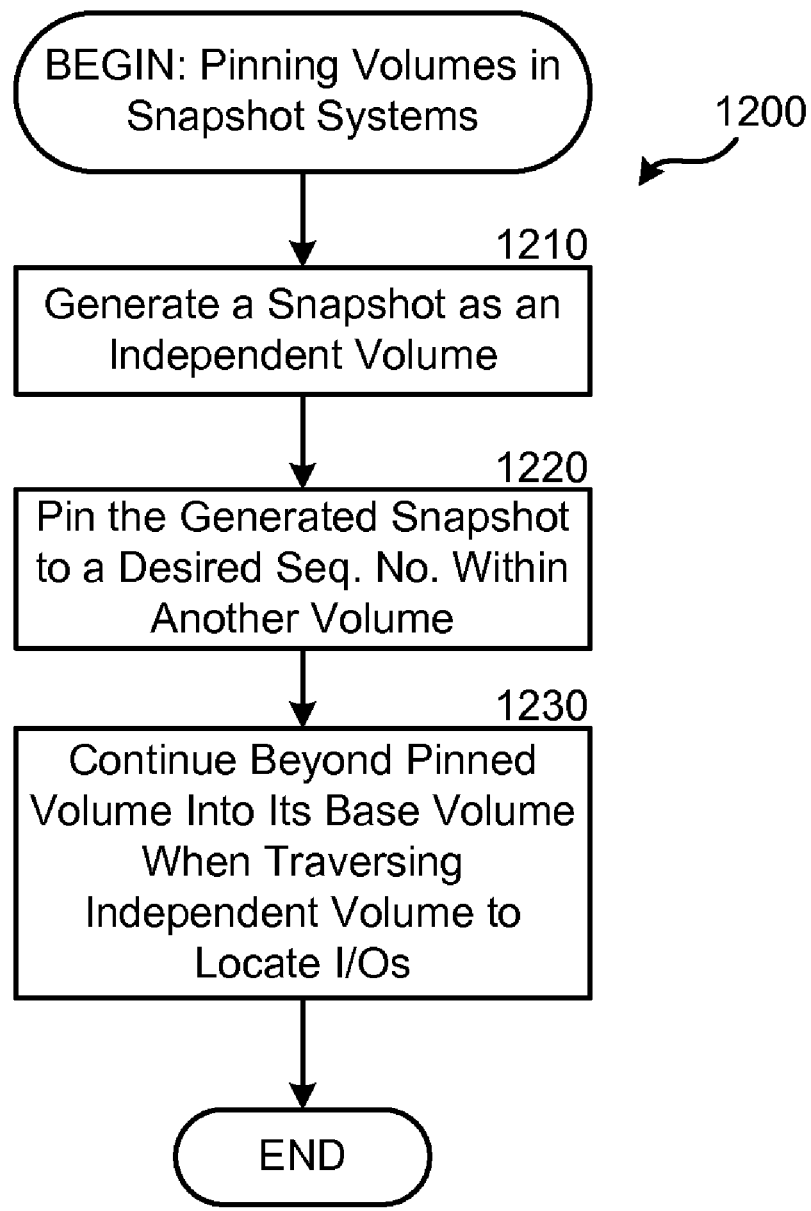
FIG. 12 is a logical flow diagram illustrating a process for pinning volumes in snapshot systems according to one exemplary embodiment.

Turning now to FIG. 12, additional details will be provided regarding the embodiments presented herein for boot consolidation using writable snapshots. In particular, FIG. 12 is a flow diagram illustrating a routine 1200 that shows aspects of an exemplary process performed by a storage server 2 for pinning volumes in snapshot systems.

The routine 1200 can begin with operation 1210 where a snapshot is generated and treated as though it were a new independent volume. The new snapshot can generally be generated from a desired sequence number snapshot in an existing volume. Since the newly generated snapshot is treated as any other volume, various read-only and writable snapshots may be generated from the newly generated snapshot.

In operation 1220, the newly generated snapshot from operation 1210 can be pinned to the desired snapshot within an already existing volume. Generally, the newly generated snapshot is pinned to the snapshot that it was generated from.

In operation 1230, any I/O operations issued to the snapshot generated in operation 1210 or any snapshots directly or indirectly dependent upon the newly created snapshots will traverse up their dependency chain, as previously discussed, to locate the relevant provision. However, in the pinned volume case, the traversal continues beyond the current volume and into the base (or root) volume at the snapshot where the pinned volume has been pinned. As discussed, the volume and location of pinning can be stored for each pinned volume to assist in this "fall-through" dependency traversal for pinned volumes. The routine 1200 can terminate after operation 1230.

Figure 13:
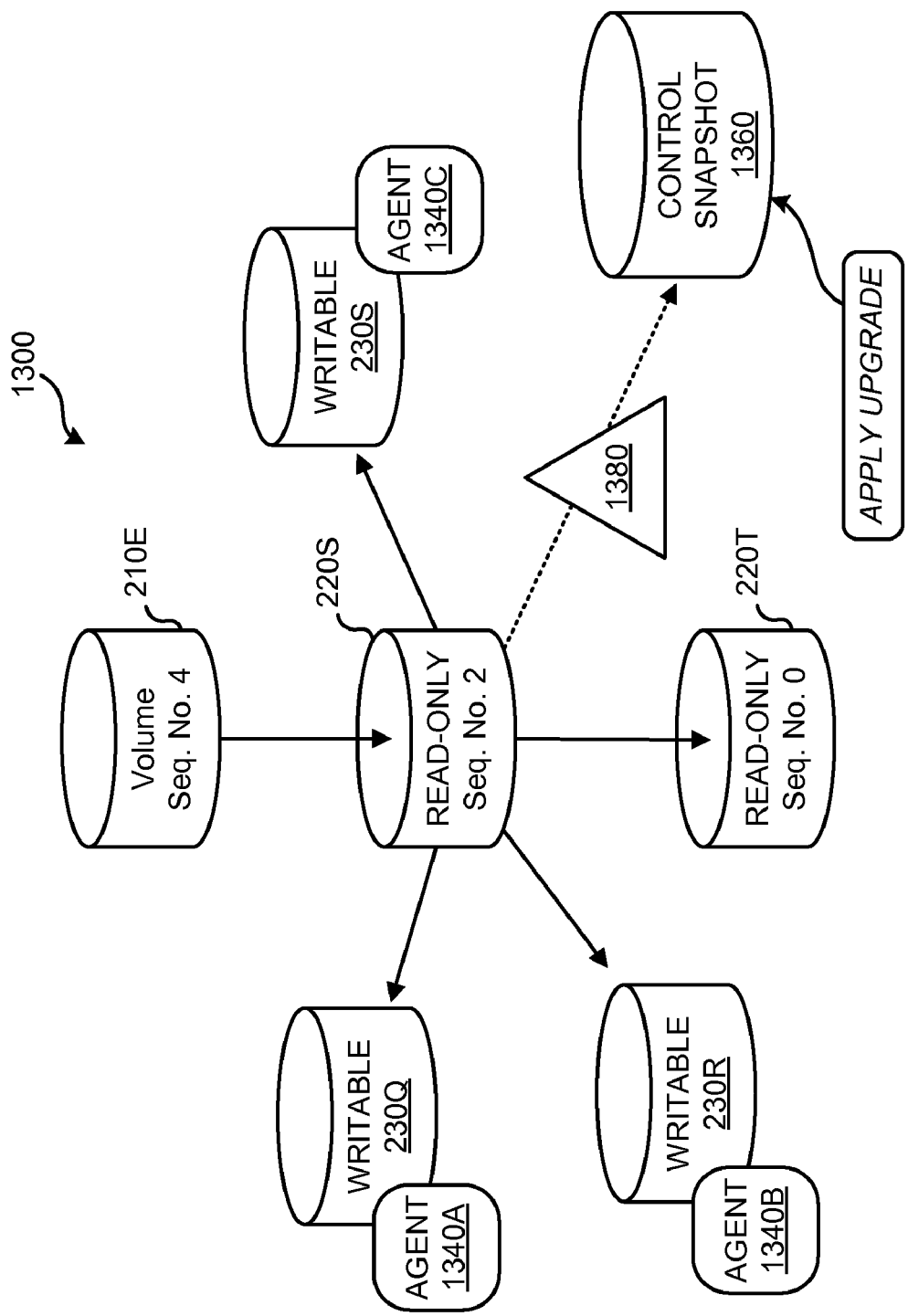
FIG. 13 is a snapshot system diagram illustrating a control snapshot for performing system-wide upgrades according to one exemplary embodiment.

Referring now to FIG. 13, a volume snapshot structure 1300 with a control snapshot 1360 for performing system-wide upgrades is illustrated according to one exemplary embodiment. In particular, FIG. 13 illustrates a system where multiple writable snapshots 230Q-230S can be upgraded using upgrade agents 1340A-1340C and a control snapshot 1360. The multiple writable snapshots 230Q-230S may have been created from a common snapshot 220S. The control snapshot 1360 can also be generated from the same common source snapshot 220S. After the desired system upgrades are applied to the control snapshot 1360, the delta 1380 (or differences) between the source snapshot 220S and the control snapshot 1360 can be established. This delta 1380 can represent the upgrade that has been made. The delta 1380 can be established on a file basis, or on physical basis with a sector, provision, track, or any other size of storage granularity.

Once the delta 1380 has been established, upgrade agents 1340A-1340C associated with each of the writable snapshots 230Q-230S can use the information in the delta 1380 to upgrade their respective writable snapshot 230Q-230S. When an upgrade agent 1340A-1340C can automatically determine how and where a change established in the delta 1380 is to be merged into the respective writable snapshot 230Q-230S, the merge can be made automatically. When a merge cannot be automatically determined, the system can prompt an administrator to step in and manually perform the specific merge operation.

An administrator of a boot consolidation system or a large group of application servers can face a formidable challenge in attempting to keep all of the systems, and each volume, and each snapshot up to date with the latest security patches, upgrades, and application software. This can require a constant stream of upgrades or new software to be installed on each of the systems corresponding to the servers, snapshots, or bootable systems. When writable snapshots are used for the purpose of boot consolidation, each writable snapshot may be independently modified. This can break the relationship between the writable snapshots and the volume. While it would be convenient for the administrator to simply upgrade the volume and have the upgrade reflected in all of the writable snapshots, this may not be possible in most cases due to any usage-based changes that may have occurred in the writable snapshots prior to the upgrade. The system-wide upgrade solution using the control snapshot 1360 and the upgrade agents 1340A-1340C can leverage the underlying snapshot system to automate and dramatically simplify the task of applying upgrades across multiple systems.

The common snapshot 220S having sequence number 2 upon which the writable snapshots 230Q-230S depend is illustrated in FIG. 13 to depend from the volume 210E having sequence number 4. Similarly, a read-only snapshot 220T having sequence number 0 depends from the common snapshot 220S. In various embodiments, the common snapshot 220S upon which the writable snapshots 230Q-230S depend could be anywhere in a chain or tree of snapshot dependencies or may even be a single volume.

Figure 14:
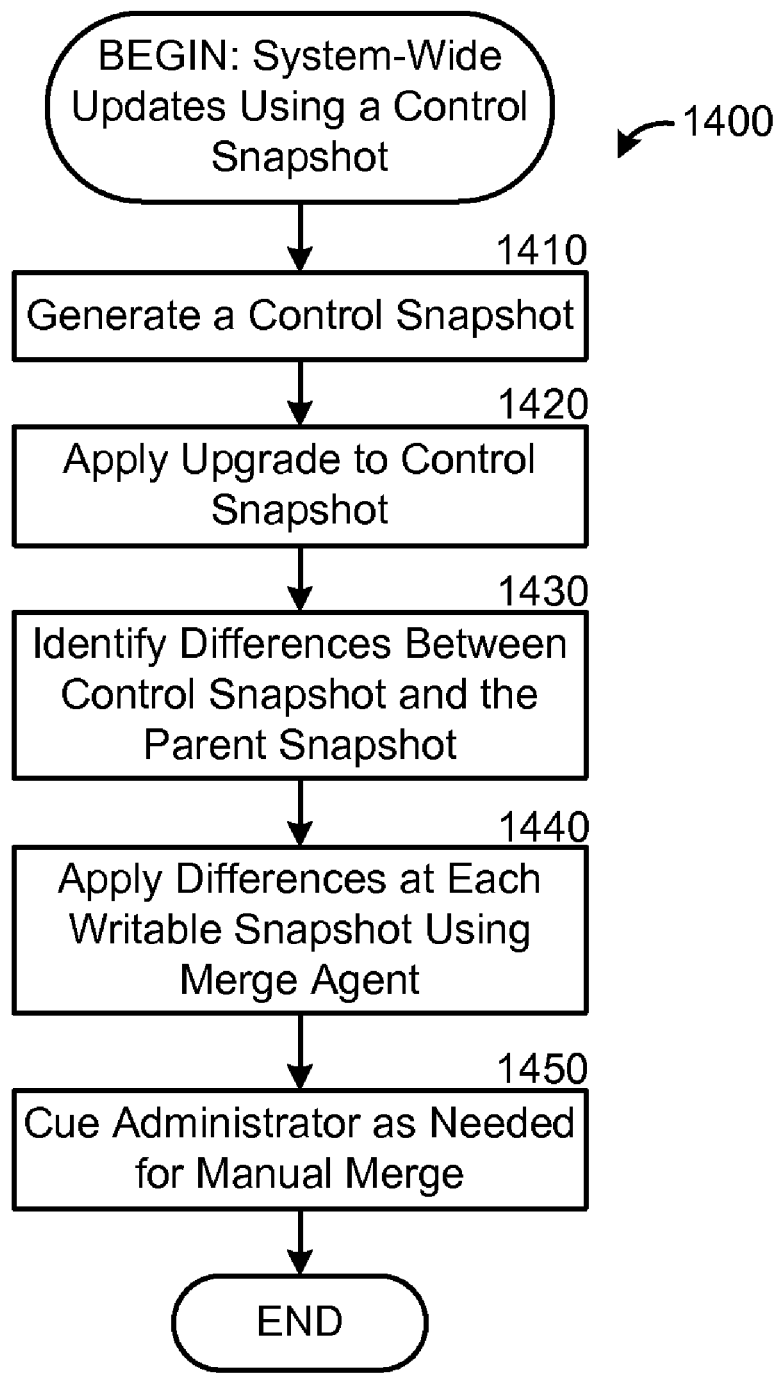
FIG. 14 is a logical flow diagram illustrating a process for system-wide updates using a control snapshot according to one exemplary embodiment.

Turning now to FIG. 14, additional details will be provided regarding the embodiments presented herein for boot consolidation using writable snapshots. In particular, FIG. 14 is a flow diagram illustrating a routine 1400 that shows aspects of an exemplary process for system-wide updates using a control snapshot. The routine can run in whole, or part, or in a distributed fashion on a storage server 2, an initiator 8, an administration system, or any combination thereof. For example, the snapshot functions may execute on the storage server 2 where the snapshots are stored, while the upgrade agents may execute at the client machine associated with the related snapshot, or on an administrator's terminal or workstation, or also on the storage server. The operations of the routine are understood to reside and execute in whole, or in part, on any components of the storage system as specific to the implementation or embodiment without exceeding the spirit or scope of this description.

The routine 1400 can begin at operation 1410 where a control snapshot 1360 can be generated from the source snapshot 220S. The source snapshot 220S can be the common parent snapshot from which the multiple writable snapshots 230Q-230S to be upgraded were originally generated from. At operation 1420, the desired system upgrades, patches, or modifications can be applied to the control snapshot 1360.

At operation 1430, the delta 1380 (or differences) between the source snapshot 220S and the control snapshot 1360 can be established. This delta 1380 can represent the upgrade that has been made. The delta 1380 can be established on a file basis, or on physical basis with a sector, provision, slice, track, or any other size of storage granularity.

At operation 1440, merge agents or upgrade agents 1340A-1340C can use the information in the delta 1380 to upgrade their respective writable snapshot 230Q-230S. When an upgrade agent 1340A-1340C can automatically determine how and where a change established in the delta 1380 is to be merged into the respective writable snapshot 230Q-230S, the merge can be made automatically. In operation 1450, the system can prompt an administrator to step in and manually perform the specific merge operation when the merge cannot be automatically determined. The routine 1400 can terminate after operation 1450.

Figure 15:
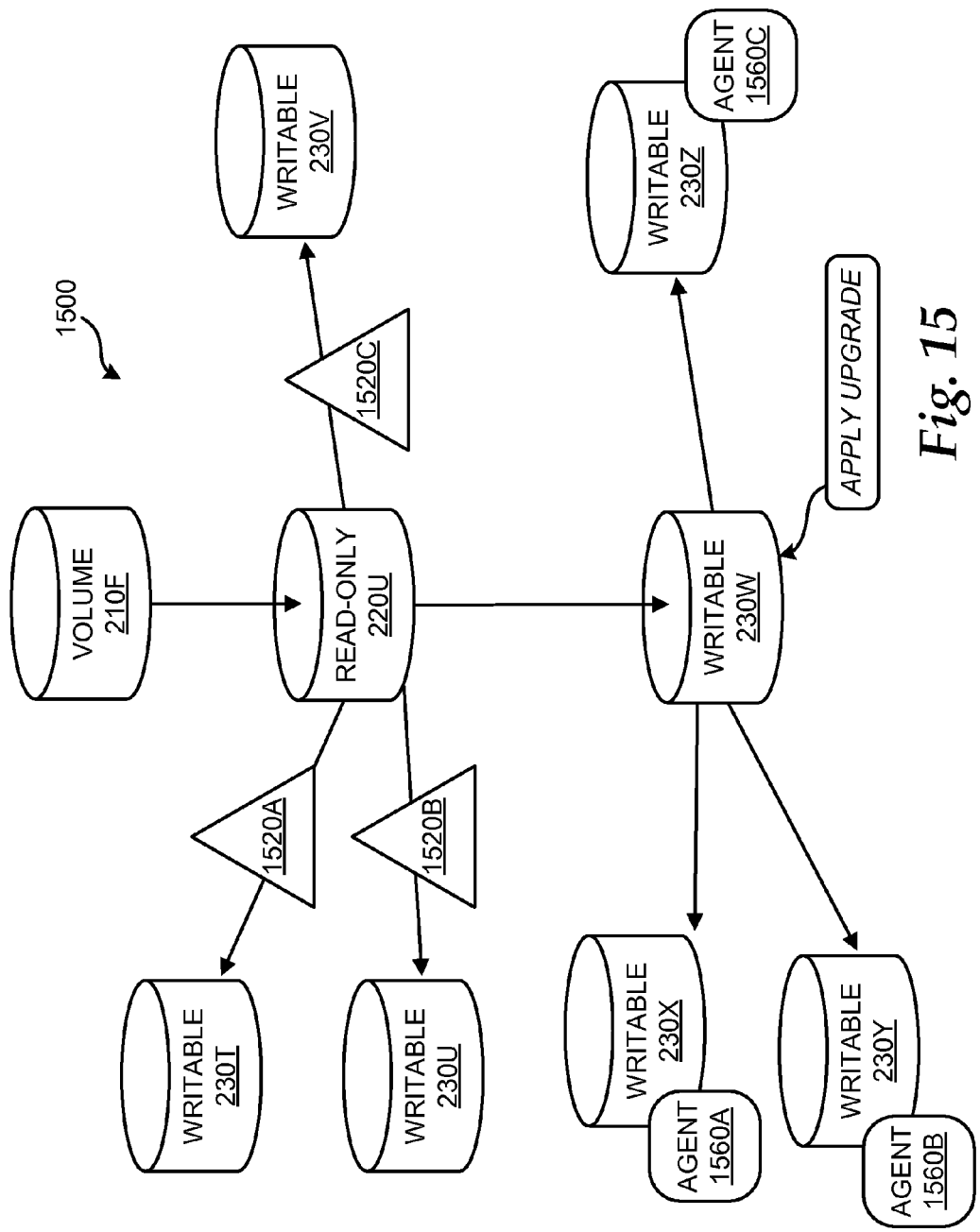
FIG. 15 is a snapshot system diagram illustrating a duplicate set of writable snapshots for performing system-wide upgrades according to one exemplary embodiment.

Referring now to FIG. 15, a volume snapshot structure 1500 where a duplicate set of writable snapshots 230X-230Z used for performing system-wide upgrades is illustrated according to one exemplary embodiment. In particular, FIG. 15 illustrates a system where multiple writable snapshots 230T-230V can be upgraded using upgrade agents 1560A-1560C and a duplicate set of writable snapshots 230X-230Z.

The multiple writable snapshots 230T-230V may have been created from a common snapshot 220U. An upgrade writable snapshot 230W can also be generated from the same common source snapshot 220U. After the desired system upgrades are applied to the upgrade writable snapshot 230W, a writable snapshot 230X-230Z can be generated from the upgrade writable snapshot 230W for each of the original writable snapshots 230T-230V. A delta 1520A-1520C (or difference) can be established between the source snapshot 220U and each of the original writable snapshots 230T-230V. These deltas 1520A-1520C can represent the changes made to the original writable snapshots 230T-230V through normal usage. The deltas 1520A-1520C can be established on a file basis, or on physical basis with a sector, provision, slice, track, or any other size of storage granularity.

Once the deltas 1520A-1520C have been established, upgrade agents 1560A-1560C associated with each of the newly created writable snapshots 230X-230Z can use the information in the corresponding delta 1520A-1520C to upgrade their respective writable snapshot 230X-230Z. When an upgrade agent 1560A-1560C can automatically determine how and where a change established in the delta 1520A-1520C is to be merged into the respective writable snapshot 230X-230Z, the merge can be made automatically. When a merge cannot be automatically determined, the system can prompt a system administrator to step in and manually perform the specific merge operation.

The snapshot-based, system-wide upgrade approach discussed here is related to, but distinct from, the approach discussed with respect to the FIGS. 13-14. The approach related to FIGS. 13-14 establishes the delta 1380 in terms of changes made by the upgrade and then propagates those changes back to the writable snapshots 230Q-230S that are already in use. Instead, this approach establishes deltas for each writable snapshot in use 230T-230V based on changes introduced through usage of the snapshots. Then, duplicates are made from the base snapshot, upgraded, and the usage-based changes are then applied to the newly created snapshots so that the new writable snapshots now have both the upgrades and the usage-based changes. The two approaches are slightly different in procedure, but can have substantially identical results. One difference is that the approach from FIGS. 13-14 applies the delta "in place" to the existing writable snapshots, while the approach of FIG. 15 creates new snapshots to be modified.

The common snapshot 220U upon which the writable snapshots 230T-230V depend is illustrated in FIG. 15 to depend from the volume 210F. However, in various embodiments, the common snapshot 220U could be anywhere in a chain or tree of snapshot dependencies or may even be a single volume. The common snapshot 220U could also be a read-only snapshot or a writable snapshot.

Figure 16:
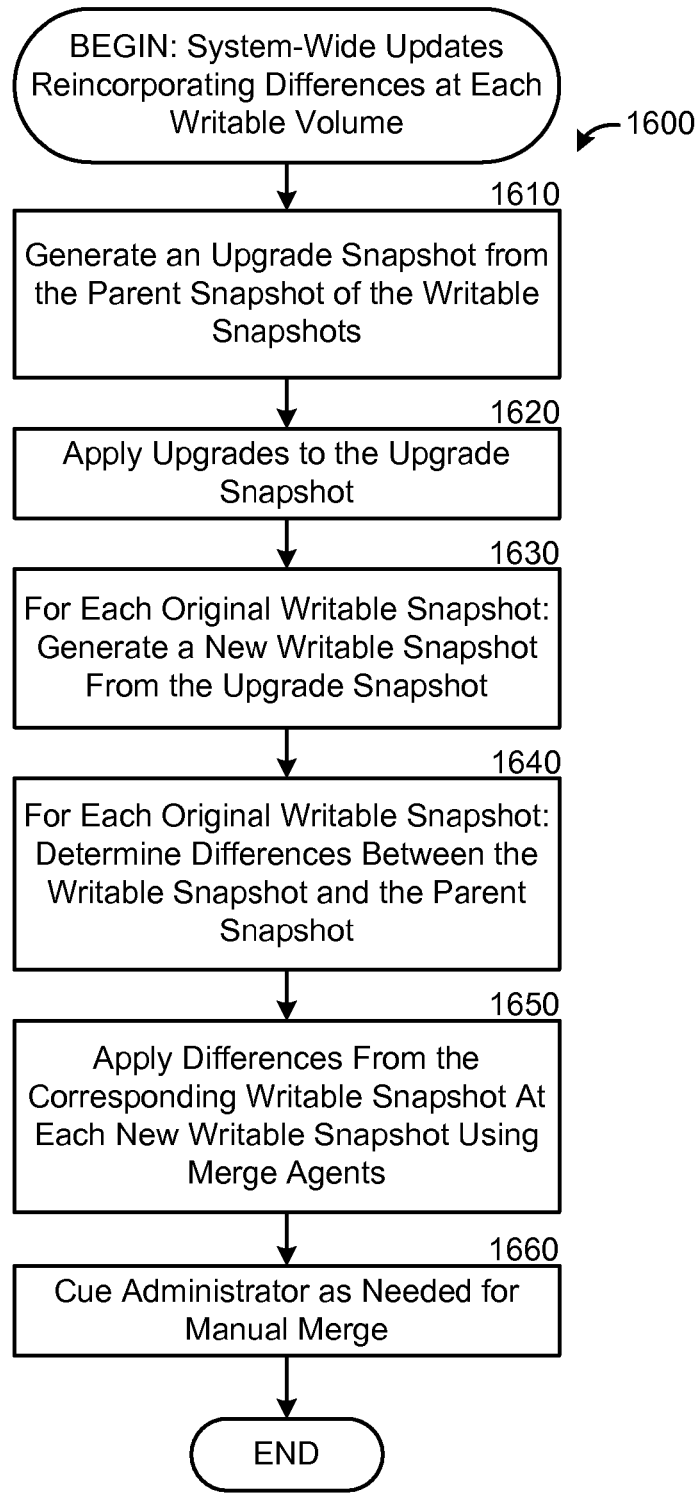
FIG. 16 is a logical flow diagram illustrating a process for system-wide updates using a duplicate set of writable snapshots according to one exemplary embodiment.

Turning now to FIG. 16, additional details will be provided regarding the embodiments presented herein for boot consolidation using writable snapshots. In particular, FIG. 16 is a flow diagram illustrating a routine 1600 that shows aspects of an exemplary process for system-wide updates using a duplicate set of writable snapshots. The routine 1600 can run in whole, or part, or in a distributed fashion on a storage server 2, an initiator 8, an administration system, or any combination thereof. For example, the snapshot functions may execute on the storage server 2 where the snapshots are stored, while the upgrade agents may execute at the client machine associated with the related snapshot, or on an administrator's terminal or workstation, or also on the storage server. The operations of the routine are understood to reside and execute in whole, or in part, on any components of the storage system as specific to the implementation or embodiment without exceeding the spirit or scope of this description.

The routine 1600 can begin with operation 1610 where an upgrade writable snapshot 230W can be generated from a common source snapshot 220U. The common source (or parent) snapshot 220U can generally be the parent snapshot from which the multiple writable snapshots 230T-230V to be upgraded were kcreated.

In operation 1620, any desired system upgrades, patches, or modifications can be are applied to the upgrade writable snapshot 230W. In operation 1630, a writable snapshot 230X-230Z can be generated from the upgrade writable snapshot 230W for each one of the original writable snapshots 230T-230V.

In operation 1640, a delta 1520A-1520C (or difference) can be established between the source snapshot 220U and each of the original writable snapshots 230T-230V. These deltas 1520A-1520C can represent the changes made to the original writable snapshots 230T-230V through normal usage. The deltas 1520A-1520C can be established on a file basis, or on physical basis with a sector, provision, track, or any other size of storage granularity.

In operation 1650, merge agents or upgrade agents 1560A-1560C that are each associated with each of the newly created writable snapshots 230X-230Z can use the information in the corresponding delta 1520A-1520C to upgrade their respective writable snapshot 230X-230Z. When an upgrade agent 1560A-1560C can automatically determine how and where a change established in the delta 1520A-1520C is to be merged into the respective writable snapshot 230X-230Z, the merge can be made automatically. In operation 1660, the system can prompt an administrator to step in and manually perform the specific merge operation when a merge cannot be automatically determined. The routine 1600 can terminate after operation 1660.

Figure 17:
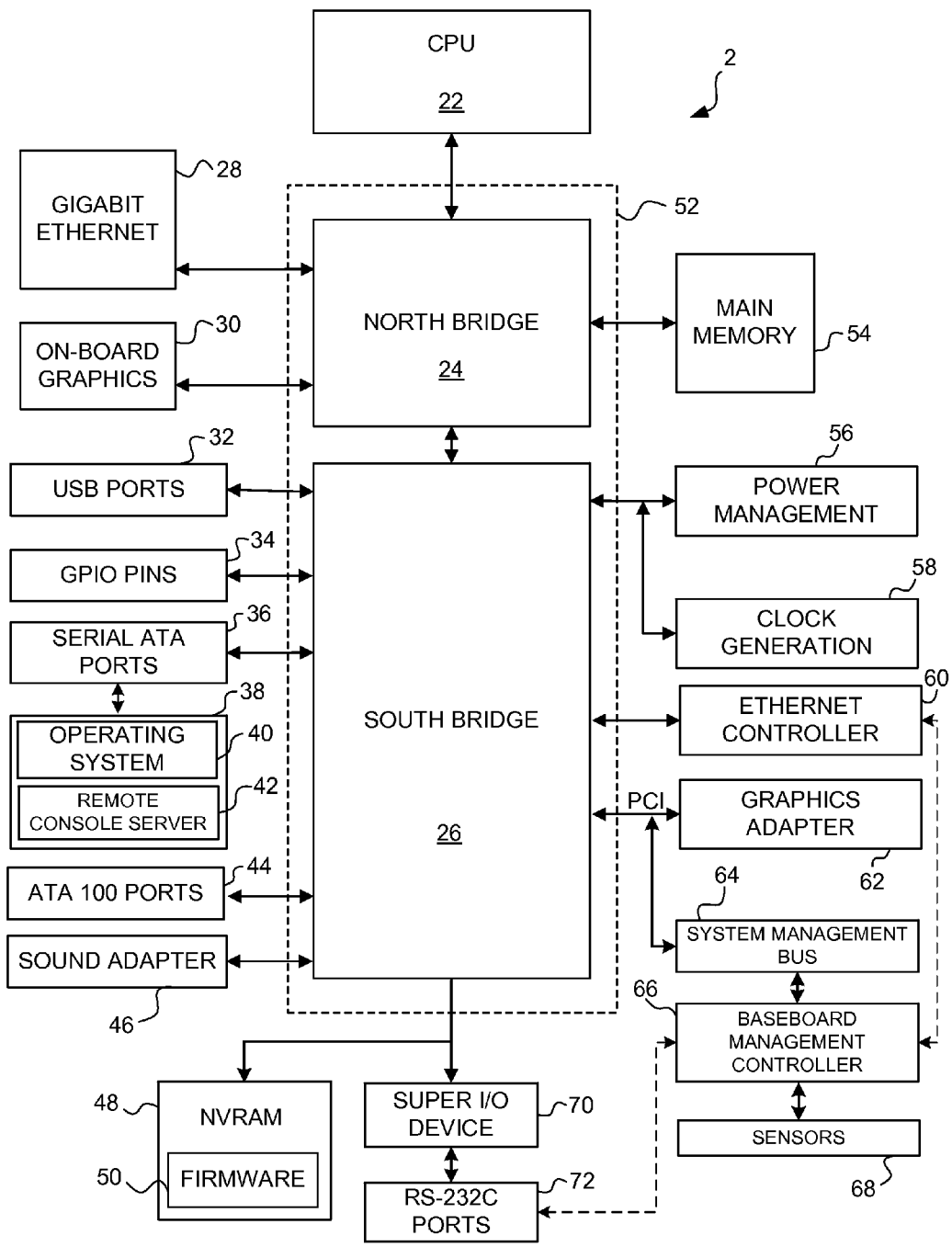
FIG. 17 is a computer architecture diagram illustrating a computer hardware architecture for a computing system capable of serving as a storage server according to one exemplary embodiment of the present invention.

FIG. 17 and the following discussion are intended to provide a brief, general description of a suitable computing environment in which the embodiments described herein may be implemented. While the technical details are presented herein in the general context of program modules that execute in conjunction with the execution of an operating system, those skilled in the art will recognize that the embodiments may also be implemented in combination with other program modules.

Generally, program modules include routines, programs, components, data structures, and other types of structures that perform particular tasks or implement particular abstract data types. Moreover, those skilled in the art will appreciate that the embodiments described herein may be practiced with other computer system configurations, including hand-held devices, multiprocessor systems, microprocessor-based or programmable consumer electronics, minicomputers, mainframe computers, and the like. The embodiments described herein may also be practiced in distributed computing environments where tasks are performed by remote processing devices that are linked through a communications network. In a distributed computing environment, program modules may be located in both local and remote memory storage devices.

In particular, FIG. 17 shows an illustrative computer architecture for a storage node computer 2 that may be utilized in the implementations described herein. The storage node computer 2 includes a baseboard, or "motherboard", which is a printed circuit board to which a multitude of components or devices may be connected by way of a system bus or other electrical communication paths. In one illustrative embodiment, a CPU 22 operates in conjunction with a chipset 52. The CPU 22 is a standard central processor that performs arithmetic and logical operations necessary for the operation of the computer. The storage node computer 2 may include a multitude of CPUs 22.

The chipset 52 includes a north bridge 24 and a south bridge 26. The north bridge 24 provides an interface between the CPU 22 and the remainder of the computer 2. The north bridge 24 also provides an interface to a random access memory ("RAM") used as the main memory 54 in the computer 2 and, possibly, to an on-board graphics adapter 30. The north bridge 24 may also include functionality for providing networking functionality through a gigabit Ethernet adapter 28. The gigabit Ethernet adapter 28 is capable of connecting the computer 2 to another computer via a network. Connections which may be made by the network adapter 28 may include LAN or WAN connections. LAN and WAN networking environments are commonplace in offices, enterprise-wide computer networks, intranets, and the internet. The north bridge 24 is connected to the south bridge 26.

The south bridge 26 is responsible for controlling many of the input/output functions of the computer 2. In particular, the south bridge 26 may provide one or more universal serial bus ("USB") ports 32, a sound adapter 46, an Ethernet controller 60, and one or more general purpose input/output ("GPIO") pins 34. The south bridge 26 may also provide a bus for interfacing peripheral card devices such as a graphics adapter 62. In one embodiment, the bus comprises a peripheral component interconnect ("PCI") bus. The south bridge 26 may also provide a system management bus 64 for use in managing the various components of the computer 2. Additional details regarding the operation of the system management bus 64 and its connected components are provided below.

The south bridge 26 is also operative to provide one or more interfaces for connecting mass storage devices to the computer 2. For instance, according to an embodiment, the south bridge 26 includes a serial advanced technology attachment ("SATA") adapter for providing one or more serial ATA ports 36 and an ATA 100 adapter for providing one or more ATA 100 ports 44. The serial ATA ports 36 and the ATA 100 ports 44 may be, in turn, connected to one or more mass storage devices storing an operating system 40 and application programs, such as the SATA disk drive 38. As known to those skilled in the art, an operating system 40 comprises a set of programs that control operations of a computer and allocation of resources. An application program is software that runs on top of the operating system software, or other runtime environment, and uses computer resources to perform application specific tasks desired by the user.

According to one embodiment of the invention, the operating system 40 comprises the LINUX operating system. According to another embodiment of the invention the operating system 40 comprises the WINDOWS SERVER operating system from MICROSOFT CORPORATION. According to another embodiment, the operating system 40 comprises the UNIX or SOLARIS operating system. It should be appreciated that other operating systems may also be utilized.

The mass storage devices connected to the south bridge 26, and their associated computer-readable media, provide non-volatile storage for the computer 2. Although the description of computer-readable media contained herein refers to a mass storage device, such as a hard disk or CD-ROM drive, it should be appreciated by those skilled in the art that computer-readable media can be any available media that can be accessed by the computer 2. By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, HD-DVD, BLU-RAY, or other optical storage, magnetic cassettes, magnetic tape, magnetic disk storage or other magnetic storage devices, or any other medium which can be used to store the desired information and which can be accessed by the computer.

A low pin count ("LPC") interface may also be provided by the south bridge 6 for connecting a "Super I/O" device 70. The Super I/O device 70 is responsible for providing a number of input/output ports, including a keyboard port, a mouse port, a serial interface 72, a parallel port, and other types of input/output ports. The LPC interface may also connect a computer storage media such as a ROM or a flash memory such as a NVRAM 48 for storing the firmware 50 that includes program code containing the basic routines that help to start up the computer 2 and to transfer information between elements within the computer 2.

As described briefly above, the south bridge 26 may include a system management bus 64. The system management bus 64 may include a BMC 66. In general, the BMC 66 is a microcontroller that monitors operation of the computer system 2. In a more specific embodiment, the BMC 66 monitors health-related aspects associated with the computer system 2, such as, but not limited to, the temperature of one or more components of the computer system 2, speed of rotational components (e.g., spindle motor, CPU Fan, etc.) within the system, the voltage across or applied to one or more components within the system 2, and the available or used capacity of memory devices within the system 2. To accomplish these monitoring functions, the BMC 66 is communicatively connected to one or more components by way of the management bus 64. In an embodiment, these components include sensor devices for measuring various operating and performance-related parameters within the computer system 2. The sensor devices may be either hardware or software based components configured or programmed to measure or detect one or more of the various operating and performance-related parameters. The BMC 66 functions as the master on the management bus 64 in most circumstances, but may also function as either a master or a slave in other circumstances. Each of the various components communicatively connected to the BMC 66 by way of the management bus 64 is addressed using a slave address. The management bus 64 is used by the BMC 66 to request and/or receive various operating and performance-related parameters from one or more components, which are also communicatively connected to the management bus 64.

It should be appreciated that the computer 2 may comprise other types of computing devices, including hand-held computers, embedded computer systems, personal digital assistants, and other types of computing devices known to those skilled in the art. It is also contemplated that the computer 2 may not include all of the components shown in FIG. 17, may include other components that are not explicitly shown in FIG. 17, or may utilize an architecture completely different than that shown in FIG. 17.

Based on the foregoing, it should be appreciated that technologies for boot consolidation using writable snapshots are presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A system for boot consolidation comprising:
   a storage subsystem;
   a physical storage device associated with the storage subsystem;
   a plurality of volume snapshots stored on the physical storage device, each one of the plurality of volume snapshots associated with a respective one of a plurality of initiators;
   one or more modules operable to cause the storage subsystem to provide each one of the plurality of initiators access to the respective associated one of the plurality of volume snapshots for booting from;
   one or more modules operable to cause the storage subsystem to create a read-only snapshot from one of the plurality of volume snapshots, wherein each one of the plurality of volume snapshots is a writable snapshot, and
   one or more modules operable to cause the storage subsystem to provide a data structure for maintaining volume snapshot dependencies, the data structure providing for arbitrary dependencies between the read-only snapshot and the one of the plurality of volume snapshots.

2. The system of claim 1, wherein each one of the plurality of volume snapshots is a snapshot of a common parent snapshot.

3. The system of claim 1, further comprising one or more modules operable to cause the storage subsystem to pin one of the plurality of volume snapshots to one of a second plurality of volume snapshots wherein pinning creates a snapshot dependency.

4. The system of claim 1, further comprising one or more modules operable to cause the system to create a writable snapshot, apply system upgrades to the writable snapshot, and propagate the upgrades to a plurality of snapshots to be upgraded.

5. A method for managing volume snapshots using dependency mapping, the method comprising:
   providing a data structure for maintaining volume snapshot dependencies, the data structure providing for arbitrary dependencies between read-only and writeable snapshots;
   adding a dependency to the data structure in response to a snapshot being created;
   determining a chain of snapshot dependency from the data structure; and
   traversing the chain of snapshot dependency to determine physical locations for data storage operations.

6. The method of claim 5, wherein the snapshot dependencies relate to snapshots used for boot consolidation.

7. The method of claim 5, wherein the snapshot dependencies each relate a sequence number of a first snapshot to the sequence number of a second snapshot, the first snapshot depending from the second snapshot.

8. The method of claim 5, wherein two or more of the snapshot dependencies indicate the dependency of two or more snapshots from a common parent snapshot.

9. The method of claim 5, wherein one of the snapshot dependencies indicates the dependency of a read-only snapshot from a writable snapshot.

10. The method of claim 5, wherein one of the snapshot dependencies indicates the dependency of a writable snapshot from a read-only snapshot.

11. The method of claim 5, further comprising a data structure for maintaining a volume pinning relationship between a first snapshot associated with a first volume to a second snapshot associated with a second volume.

12. The method of claim 11, wherein a chain of snapshot dependency including the second snapshot also includes the first snapshot.

13. A method for system-wide updates, the method comprising:
   providing a writable snapshot system;
   generate a writable snapshot;
   applying an update to the writable snapshot;
   creating delta information associated with the update; and
   propagating the update to a plurality of snapshots to be updated, the propagating comprising:
      determining if the update can be applied automatically;
      automatically applying the update in response to determining that the update can be applied automatically; and generating a notification requesting manual intervention in response to determining that the update cannot be applied automatically.

14. The method of claim 13, wherein the writable snapshot is a control snapshot created from a common parent snapshot of the plurality of snapshots to be updated.

15. The method of claim 14, wherein the delta information contains differences between the updated control snapshot and the common parent snapshot; and propagating the update comprises applying the delta information to the plurality of snapshots to be updated.

16. The method of claim 13, wherein the writable snapshot is a snapshot of a common parent snapshot of the plurality of snapshots to be updated.

17. The method of claim 16, wherein the delta information contains differences between each of the plurality of snapshots to be updated and the common parent snapshot; propagating the update comprises, for each one of the plurality of snapshots to be updated, generating an updatable snapshot of the writable snapshot and applying the respective delta information to the updatable snapshot.

* * * * *